US 6,915,494 B2

(12) United States Patent
Shigeta

(10) Patent No.: US 6,915,494 B2
(45) Date of Patent: Jul. 5, 2005

(54) FAULT ANALYZING SYSTEM, METHOD FOR PURSUING FAULT ORIGIN AND INFORMATION STORAGE MEDIUM FOR STORING COMPUTER PROGRAM REPRESENTATIVE OF THE METHOD

(75) Inventor: Kazuki Shigeta, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 720 days.

(21) Appl. No.: 09/864,327

(22) Filed: May 25, 2001

(65) Prior Publication Data

US 2001/0049802 A1 Dec. 6, 2001

(30) Foreign Application Priority Data

May 30, 2000 (JP) ........................................ 2000-160983

(51) Int. Cl.⁷ .............................................. G06F 17/50
(52) U.S. Cl. ................................................ 716/4; 716/6
(58) Field of Search ............................................ 716/4, 6

(56) References Cited

U.S. PATENT DOCUMENTS 6,170,078 B1 * 1/2001 Erle et al. ........................ 716/4
6,370,492 B1 * 4/2002 Akin ............................. 703/13

FOREIGN PATENT DOCUMENTS

JP 2655105 5/1997
JP 2921502 4/1999

* cited by examiner

Primary Examiner—Vuthe Siek
Assistant Examiner—Brandon Bowers
(74) Attorney, Agent, or Firm—Whitham, Curtis & Christofferson, P.C.

(57) ABSTRACT

A fault analyzing system presumes fault propagation paths for specifying nodes related to fault terminals once on plural time planes, and merges pieces of related fault terminal information representative of the fault terminals related to the nodes on different time planes in different manners so that plural list of plural kinds of fault are drawn up without repeating the time-consuming presumption.

33 Claims, 20 Drawing Sheets

FAULT ANALYZING SYSTEM, METHOD FOR PURSUING FAULT ORIGIN AND INFORMATION STORAGE MEDIUM FOR STORING COMPUTER PROGRAM REPRESENTATIVE OF THE METHOD

FIELD OF THE INVENTION

This invention relates to a fault analyzing system for a semiconductor device and, more particularly, to a fault analyzing system for nominating candidates of a fault origin through tracing signal propagation paths from output terminals, a method for pursuing a fault origin and an information storage medium for storing a computer program representative of the method.

DESCRIPTION OF THE RELATED ART

When a diagnosis system finds a product of a semiconductor device defective, the fault analyzing system traces the signal propagation paths from the output signal pins toward the upstream, and nominates the candidates of a fault origin which are to satisfy the output signal pattern at the output signal nodes. Examples of the fault analyzing system are disclosed in Japanese Patent Publication of Unexamined Application Nos. 8-146093 and 10-062494. Japanese Patent Publication of Unexamined Application Nos. 8-146093 and 10-062494 have resulted in Japanese Patent Nos. 2655105 and 2921502, respectively. These prior art fault analyzing systems firstly extract partial circuits related to the output terminals where the output signal pattern differs from an expected signal pattern, and presume the signal propagation paths of the output signal pattern. If necessary, the prior art fault analyzing systems further extract partial circuits closer to the signal input terminals, and nominate the candidates of the signal propagation paths from the fault origin. The prior art fault analyzing systems weight the nodes on the candidates on the basis of the connections in the candidates, and determine the heaviest nodes. The prior art fault analyzing systems output the pieces of analysis information representative of the fault origins.

FIG. 1 shows the scheme of the prior art fault analyzing system. The prior art fault analyzing system comprises an input unit 1, a fault propagation path presuming unit 2, a memory unit 4 and an output unit 6. The input unit 1 is implemented by a keyboard or an interface to an output system, and is connected to the fault propagation path presuming unit 2. A display unit, a printer unit or an interface to the output system serves as the output unit 6, and the fault propagation path presuming unit 2 is connected to the output unit 6. The fault propagation path presuming unit 2 has a data processing capability, and a computer program runs on the fault propagation path presuming unit 2. The memory unit 4 is prepared for storing pieces of data information, which are used in the fault path pursuing. The memory unit 4 is connected to the fault propagation path presuming unit 2.

In detail, the memory unit 4 includes a memory 41 for circuit layout and a memory 42 for logic state. An integrated circuit includes logic circuits, and gates and signal lines form in combination each of the logic circuits. The gates are connected through the signal lines to one another. The gates, the function of each gate, the signal lines and the connections thereof are represented by pieces of data information, and these pieces of data information are stored in the memory 41 for circuit layout. When signals are propagated through the integrated circuit, the gates sequentially operate, and determine the logic state on the signal line or lines connected to the output node or nodes thereof. The memory 42 for the logic state is broken down into two sections. One of the sections is assigned to presumed logic state on the signal lines, and the other section is assigned to the expected logic state of the signal lines. Pieces of data information representative of the presumed logic state are stored in the section assigned to the section of the memory 42, and pieces of data information representative of the expected logic state are stored in the other section of the memory 42.

The fault propagation path presuming unit 2 includes an error signal detector 21, a partial circuit extractor 22, a logic state presumer 23, a logic state registrar 24, a candidate nominator 27 and a candidate reporter 28. The error signal detector 21 checks the output signal pattern to see whether or not an error signal is output from any one of the output terminals. When the error signal is found, the error signal detector 21 fetches the pieces of data information stored in the memory 41 for circuit configuration and the memory 42 for logic state, and specifies the output terminal where the error signal was found. The error signal detector 21 notifies the specified output terminal to the partial circuit extractor 22. However, if the error signal detector 21 does not find any error signal, the fault propagation path presuming unit 2 terminates the operation.

When the piece of data information representative of the specified output terminal reaches the partial circuit extractor 22, the partial circuit extractor 22 accesses the pieces of data information stored in the memory 41, and selects the circuits to be related to the specified output terminal, and notifies the selected circuits to the logic state presumer 23. When the logic state presumer 23 receives the pieces of data information representative of the selected circuits, the logic state presumer 23 fetches pieces of data information necessary for the presumption from the memories 41 and 42, and presumes the fault propagation path. The logic state presumer 23 supplies pieces of data information representative of the result of the presumption to the logic state registrar 24. The logic state registrar 24 stores the pieces of data information representative of the presumed logic state of the selected partial circuits in the memory 42.

The candidate nominator 27 takes the fault propagation path presumed by the logic state presumer 23 into account, and nominates all the nodes related to the fault, i.e., the gates and the signal lines which the fault is presumed to be propagated through. The candidate nominator 27 supplies pieces of data information representative of the candidates to the candidate reporter 28. When the pieces of data information reach the candidate reporter 28, the candidate reporter 28 outputs signals representative of the candidates to the output unit 6.

FIG. 2 shows a sequence of the presumption carried out by the prior art fault analyzing system. When the prior art fault analyzing system starts the presumption, the error signal detector 21 accesses the pieces of data information stored in the memories 41 and 42, and specifies an output terminal or where the error signal or signals appear as by step A11.

When the error signal detector 21 determines the output terminal or terminals, the prior art fault analyzing system checks the analyzing history to see whether or not any one of the output terminals is not considered as by step A12. If the answer at step A12 is given affirmative, the partial circuit extractor 22 accesses the pieces of data information stored in the memory 41, and extracts partial circuits related to the fault propagation to the specified output terminal as by step A13. The extraction of the related circuits may be carried out through tracing the partial circuits along the direction between the input terminals and the output terminals several times as taught by Japanese Patent Publication of Unexamined Application No. 10-062494. Otherwise, the hierarchy of the circuits used in the circuit design is available for the extraction.

Subsequently, the logic state presumer 23 accesses the pieces of data information stored in the memory 41 and the pieces of data information representative of the logic state at the boundaries between the extracted partial circuits stored in the memory 42, and presumes the fault propagation path through the partial circuits as by step A14.

Subsequently, the logic state registrar 24 stores the pieces of data information representative of the presumed logic state in the memory 42 as by step A15. Upon completion of the registration, the prior art fault analyzing system returns to step A11, and further checks the output signal pattern for another error output signal. The prior art fault analyzing system repeats the loop consisting of steps of A11 to A15 until the answer at step A12 is changed to negative.

With the negative answer at step A12, the candidate nominator 27 searches the memory 42 for the nodes and the signal lines on the presumed fault propagation path, and nominates the nodes and the signal lines on the presumed fault propagation path as candidates of the fault origin as by step A18. The candidate nominator 27 supplies pieces of data information representative of the candidates of the fault origin to the candidate reporter 28, and the candidate reporter 28 delivers the pieces of data information representative of the candidates of the fault origin to the output unit 6 as by step A19.

FIG. 3 shows an image of an integrated circuit. Description is hereinbelow made on how the integrated circuit is analyzed by the prior art fault analyzing system. The integrated circuit is a sequential circuit which includes six flip flop circuits FF1, FF2, FF3, FF4, FF5 and FF6. It is assumed to find four error signals at output terminals F1, F2, F3 and F4 at time (T+2). An output terminal at which an error output signal appears is hereinbelow referred to as "fault terminal".

The error signal detector 21 checks the output terminals for an error output signal, and specifies the failure output terminals F1, F2, F3 and F4 at time (T+2) at step A11. The prior art fault analyzing system proceeds through step A12 to step A13. The partial circuit extractor 22 accesses the pieces of data information stored in the memory 41 representative of the circuit layouts, and extracts the partial circuits c1, c2 and c3 related to the output signal terminals F1, F2, F3 and F4. The partial circuits have a boundary defined by the flip flops.

Subsequently, the logic state presumer 23 accesses the pieces of data information representative of the circuit layouts and stored in the memory 41 and the pieces of data information representative of the logic state of the partial circuits and stored in the memory 42, and presumes fault propagation paths. The logic state presumer 23 presumes a signal path p12, signal paths p13, p14 and p15 and a signal path p16 to be the fault paths in the partial circuits c1, c2 and c3, respectively, at step A14.

Subsequently, the logic state registrar 24 writes the pieces of data information representative of the presumed logic state, which were presumed at step A14 for the partial circuits, in the memory 42 at step A15. Moreover, the FF4, FF5 and FF6 are registered as fault terminals. The prior art fault analyzing system returns to step A11. The error signal detector 21 searches the memory for another fault terminal, and finds the flip flops FF4, FF5 and FF6 to be the fault terminals at time T+1. The prior art fault analyzing system repeats the loop consisting of steps A12 to A15. When the answer at step A12 is given negative, the pieces of data information representative of the partial circuits c1 to c7 and the pieces of data information representative of the fault paths p1 to p16 are stored in the memory.

The prior art fault analyzing system proceeds to step A18, and the candidate nominator 27 searches the fault paths for the nodes, i.e., the gates and the signal lines on the fault paths. The fault path p1 is assumed to propagate the fault. Then, the candidate nominator 27 picks up all the nodes on the fault path p1, and the candidate reporter 28 delivers the pieces of data information representative of all the nodes on the fault path p1 to the output unit 6.

The prior art fault analyzing system assumes that the fault origin is a single stuck-at fault, and does not weight other kinds of fault. When another fault analyzing method such as a fault dictionary method or a fault simulation method is employed, a fault is assumed to be in a target circuit, and a logic simulation is carried out. The result of the logic simulation is compared with the actual logic state so as to judge whether or not the assumption is appropriate. However, it is difficult to presume another fault different from the fault previously assumed. If another fault such as an open fault or a bridge fault is assumed, a large amount of logic simulation is required for the fault analyzing, and fault analyzing systems can not complete the analysis within a reasonable time period. Moreover, there is not any means which weights the nodes for the open fault or the bridge fault. Thus, only the single stuck-up fault is feasible assumption, and the prior art fault analyzing systems presume the fault origins on the assumption that the fault origin is the single stuck-up fault. In short, the prior art fault analyzing systems searches a sequential circuit for the fault paths which satisfy the error signals at all the fault terminals, and are available for the single stuck-up fault only. This is the problem to be solved by the present invention.

SUMMARY OF THE INVENTION

It is therefore an important object of the present invention to provide a fault analyzing system, which is available for various kinds of fault such as, for example, the open fault, the bridge fault and the stuck-at fault without consuming a long time period.

It is another important object of the present invention to provide a method for presuming a fault origin which is carried out in the fault analyzing system.

It is also an important object of the present invention to provide an information storage medium, in which a computer program representative of the method is stored.

In accordance with one aspect of the present invention, there is provided a fault analyzing system for finding candidates of plural kinds of fault comprising a fault propagation path presuming unit presuming logic state along signal paths for determining fault propagation paths connected to output terminals where error signals are observed and specifying fault terminals related to nodes on the fault propagation paths for producing pieces of related fault terminal information on plural time planes, and a fault candidate weighting unit merging the pieces of related fault terminal information on one of the plural time planes with the pieces of related fault terminal information on another of the plural time planes in different manners so as to determine plural groups of fault candidates for the plural kinds of fault.

In accordance with another aspect of the present invention, there is provided a method for finding candidates of plural kinds of fault comprising the steps of a) determining output terminals where error signals are observed, b) specifying fault terminals related to nodes of an electric circuit found on fault propagation paths to the output terminals for producing pieces of related fault terminal information on plural time planes, and c) merging the pieces of related fault terminal information representative of the fault terminals related to the nodes on one of the plural time planes with the pieces of related fault terminal information representative of the fault terminals related to the nodes on another of the plural time planes in different manners so as to determine plural groups of fault candidates for the plural kinds of fault.

In accordance with yet another aspect of the present invention, there is provided an information storage medium for storing a computer program representative of a method for finding candidates of plural kinds of fault, and the method comprises the steps of a) determining output terminals where error signals are observed, b) specifying fault terminals related to nodes of an electric circuit found on fault propagation paths to the output terminals for producing pieces of related fault terminal information on plural time planes and c) merging the pieces of related fault terminal information representative of the fault terminals related to the nodes on one of the plural time planes with the pieces of related fault terminal information representative of the fault terminals related to the nodes on another of the plural time planes in different manners so as to determine plural groups of fault candidates for the plural kinds of fault.

BRIEF DESCRIPTION OF THE DRAWINGS

The features and advantages of the failure analyzing system, the method and the information storage medium will be more clearly understood from the following description taken in conjunction with the accompanying drawings in which.

DESCRIPTION OF THE PREFERRED EMBODIMENTS

Description is hereinbelow made on embodiments of the present invention with reference to the drawings. The fault analyzing systems according to the present invention are categorized in a tracing path technology, and presume fault propagation paths from failure output terminals toward input terminals.

A fault analyzing system according to the present invention extracts partial circuits from an integrated circuit to be analyzed, and presumes logic state inside extracted partial circuits. The fault analyzing system preserves pieces of related fault terminal information on fault paths. The fault analyzing system weights candidates of a fault origin, and merges the pieces of related fault terminal information of the nodes on the fault path in the weighting operation on the candidates. When the fault analyzing system merges the pieces of related fault terminal information for a stuck-up fault, the fault analyzing system takes the location of the nodes on the fault path and the logic state thereof into account, and weight the candidates. On the other hand, when the fault analyzing system merges the pieces of related fault terminal information for an open fault, the fault analyzing system takes only the locations of the nodes into account, and weights the candidates. The fault analyzing system pairs two nodes on the fault path for forming a fault candidate pair, and weights the candidates of a bridge fault. Finally, the fault analyzing system mixes those kinds of fault for producing a mixed fault candidate list.

First Embodiment

Figure 4:
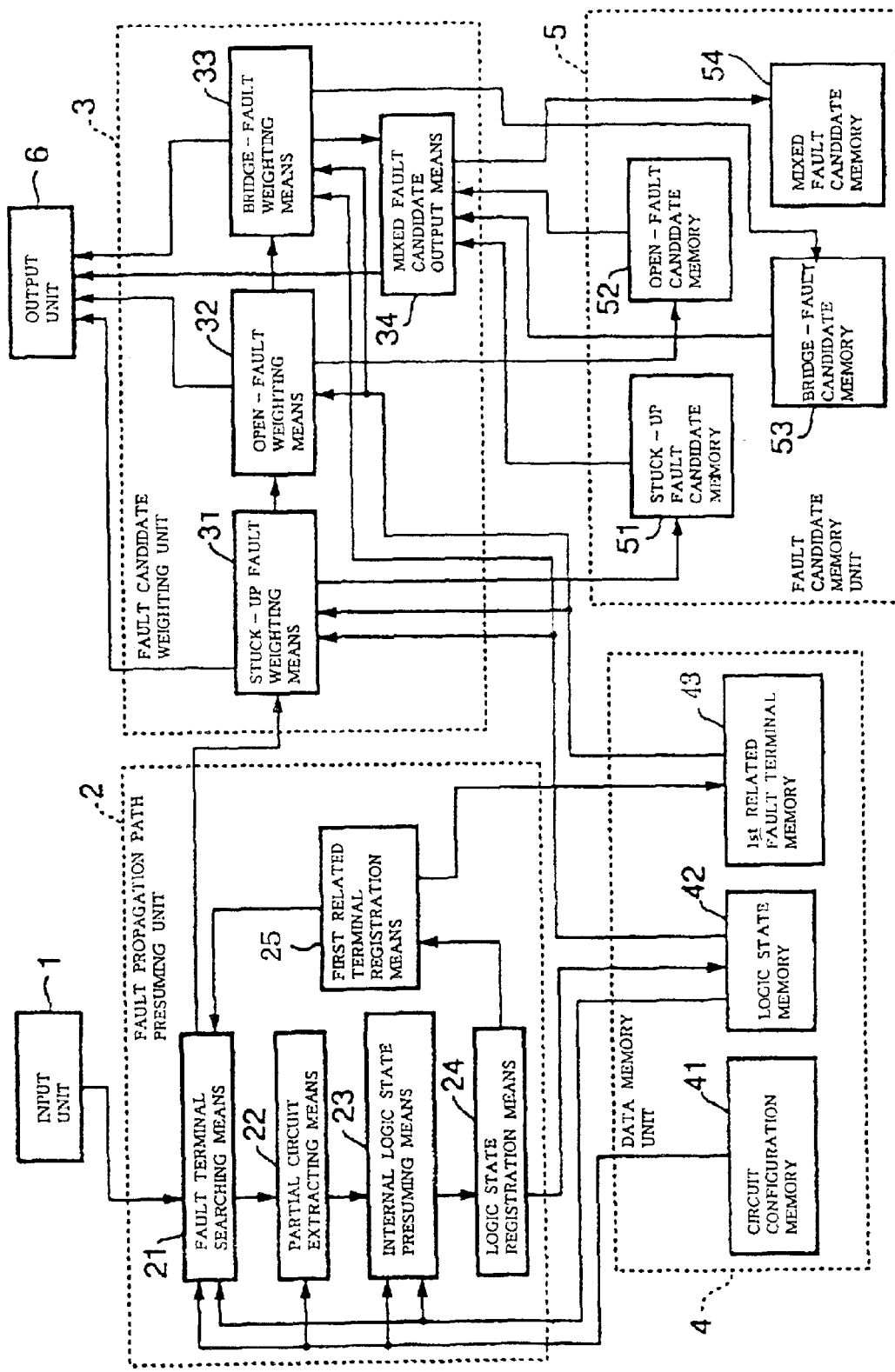
FIG. 4 is a block diagram showing the arrangement of a fault analyzing system according to the present invention.

Referring to FIG. 4 of the drawings, a fault analyzing system embodying the present invention comprises an input unit 1, a fault propagation path presuming unit 2, a fault candidate weighting unit 3, a data memory unit 4, a fault candidate memory unit 5 and an output unit 6. A keyboard or an interface to an external system serves as an input unit 1, and the output unit 6 is implemented by a display unit, a printer or an interface to the external system. A data processor is incorporated in the fault propagation path presuming unit 2, and a computer program runs on the data processor. The fault propagation path presuming unit is associated with the data memory, and the fault candidate weighting means is associated with both of the data memory unit and the fault candidate memory unit. Pieces of data information required for the presumption are stored in the data memory unit 4, and pieces of candidates and pieces of related fault terminal information are stored in the fault candidate memory unit 5.

The data memory unit 4 includes three memories 41, 42 and 43, which are referred to as "circuit configuration memory", "logic state memory" and "first related fault terminal memory", respectively. Various logic circuits are incorporated in an integrated circuit, and gates and signal lines form each logic circuit. The gates and the signal lines are hereinbelow referred to as "nodes". The pieces of data information stored in the circuit configuration memory 41 are representative of the gates, the signal lines and the connections there-among. The pieces of data information stored in the logic state memory 42 are representative of the logic state on the signal lines to be determined in the presumption of fault propagation paths and the expected logic state on the signal lines on the condition without any fault. The first related fault terminal memory 43 is assigned to the pieces of related fault terminal information.

The pieces of related fault terminal information stored in the first related fault terminal memory 43 are representative of fault terminals related to the nodes on the fault propagation paths presumed by the fault propagation path presuming unit 2.

The fault candidate memory unit 5 includes a stuck-at fault candidate memory 51, an open-fault candidate memory 52, a bridge-fault candidate memory 53 and a mixed fault candidate memory 54. Pieces of stuck-at fault candidate information are stored in the stuck-at candidate memory 51, and are representative of candidates of stuck-at fault and fault terminals related to the stuck-at fault candidates. Pieces of open-fault candidate information are stored in the open-fault candidate memory 52, and are representative of candidates of open-fault and fault terminals related to the open-fault candidates. Pieces of bridge-fault candidate information are stored in the bridge-fault candidate memory 53, and are representative of candidates of bridge-fault and fault terminals related to the bridge-fault candidates. Pieces mixed fault candidate information are stored in the mixed fault candidate memory 54, and are representative of candidates of mixed fault and fault terminals related to the stuck-at fault candidates.

The fault propagation path presuming unit 2 includes a fault terminal searching means 21, a partial circuit extracting means 22, an internal logic state presuming means 23, a logic state registration means 24 and a first related terminal registration means 25. The fault terminal searching means 21 accesses the pieces of data information stored in the circuit configuration memory 41 and the logic state memory 42, and looks for a failure output terminal or terminals. If the fault terminal searching means 21 does not find any fault terminal, the fault propagation path presuming unit 2 terminates the presuming operation. The partial circuit extracting means 22 accesses the pieces of data information stored in the circuit configuration memory 41, and determines partial circuits related to the fault terminals already found by the fault terminal searching means 21. The internal logic state presuming means 23 accesses the pieces of data information stored in the circuit configuration memory 41 and the logic state memory 42, and presumes fault propagation paths on the basis of the layout of the partial circuits and the logic state at the boundaries of the partial circuits. The logic state registration means 24 registers the logic state presumed by the internal logic state presuming means 23 in the logic state memory 42. The first related terminal registration means 25 investigates the fault propagation paths presumed by the internal logic state presuming means 23, and determines the nodes on the fault propagation paths so as to write pieces of related fault terminal information representative of the fault terminals related to the nodes on the fault propagation paths in the first related fault terminal memory 43.

The fault candidate weighting unit 3 includes a stuck-at fault weighting means 31, an open-fault weighting means 32, a bridge-fault weighting means 33 and a mixed fault candidate output means 34. The stuck-at fault is a kind of fault, which causes a node to be in a certain logic level at all times. Even if a doubtful node changes the logic state with time, the doubtful node is a candidate of the stuck-at fault in so far as the fault state is not propagated to the output terminal. The stuck-at fault weighting means 31 gives a weight to candidates of the stuck-at fault. Of course, the stuck-at weighting means 31 gives the weight to the doubtful node.

The open-fault is another kind of fault, which causes a node to be fixed to a certain location. It is not necessary for the open-fault to be fixed to a certain logic level. An example of the open-fault is a damaged gate. The gate function is not observed in the damaged gate. The open-fault weighting means 32 gives a weight to candidates of the open-fault. Of course, the open-fault weighting means 32 gives the weight to the damaged gate.

The bridge-fault is yet another kind of fault, which causes two nodes to be concurrently in the logic level on either node. The bridge-fault weighting means 33 gives a weight to candidates of the bridge-fault.

Figure 5:
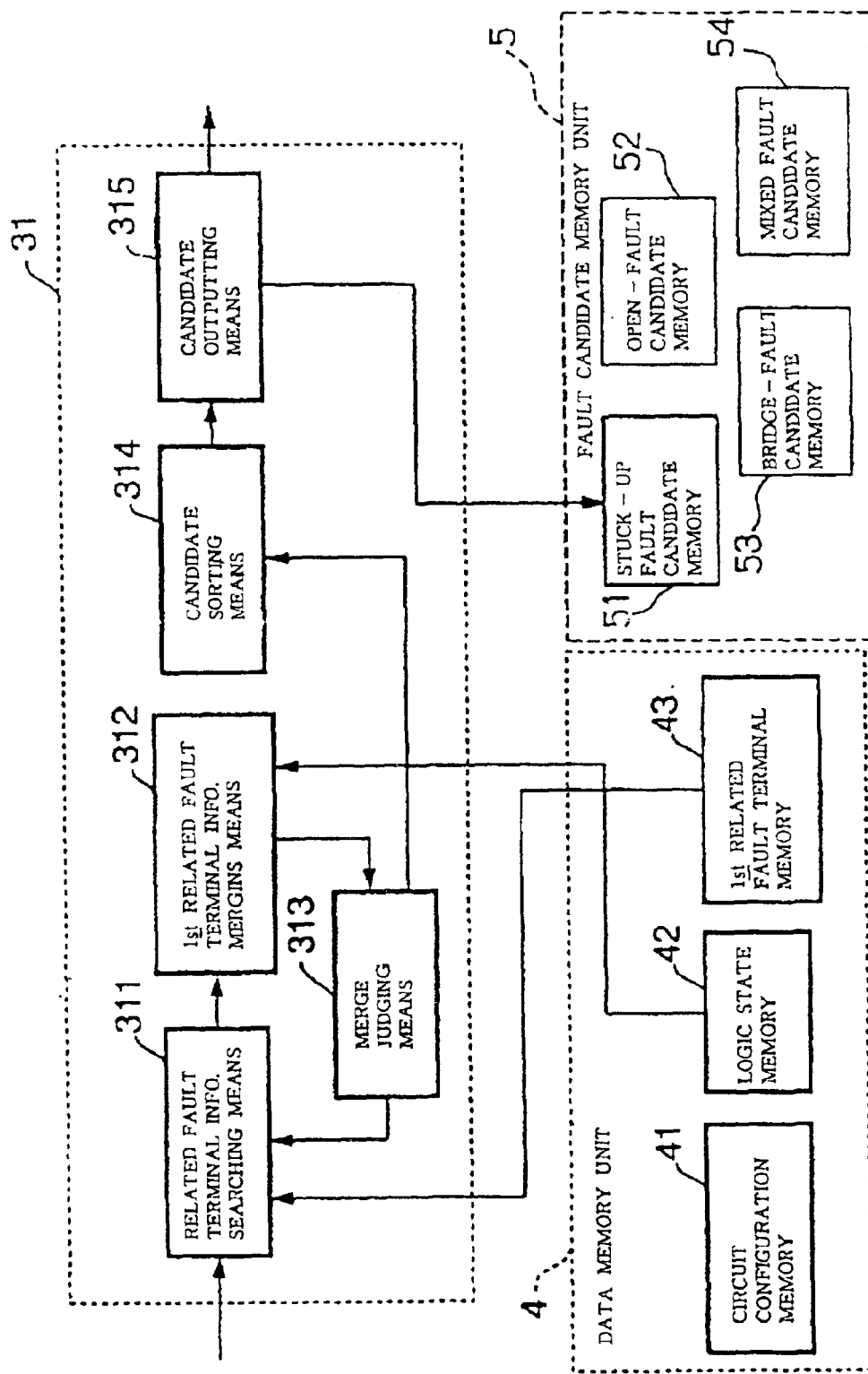
FIG. 5 is a block diagram showing the arrangement of a stuck-at fault weighting means together with a data memory unit and a fault candidate memory unit.

Turning to FIG. 5 of the drawings, the stuck-at fault weighting means 31 includes a related fault terminal information searching means 311, a first related fault terminal information merging means 312, a merge judging means 313, a candidate sorting means 314 and a candidate outputting means 315. The related fault terminal information searching means 311 searches the first related fault terminal memory 43 for the pieces of related fault terminal information representative of the fault terminals of nodes on the fault propagation paths at a given time.

The first related fault terminal information merging means 312 merges the pieces of related fault terminal information representative of the nodes on the fault propagation paths at a certain time and the pieces of related fault terminal information representative of the same nodes at another time if the logic level at the certain time is identical with the logic level at another time.

The merge judging means 313 monitors the merging work to see whether or not the first related fault terminal information merging means 312 completes the merging work for all the times. The candidate sorting means 314 is operative to sort the candidates of the stuck-at fault with the number of related fault terminals, which is determined by the first related fault terminal information merging means 312, as the weight. The candidate sorting means 314 forms a list of the stuck-at fault. The candidate outputting means 315 delivers the pieces of stuck-up fault candidate information representative of the list and the related fault terminals to the stuck-at fault candidate memory 51 and the output unit 6.

Figure 6:
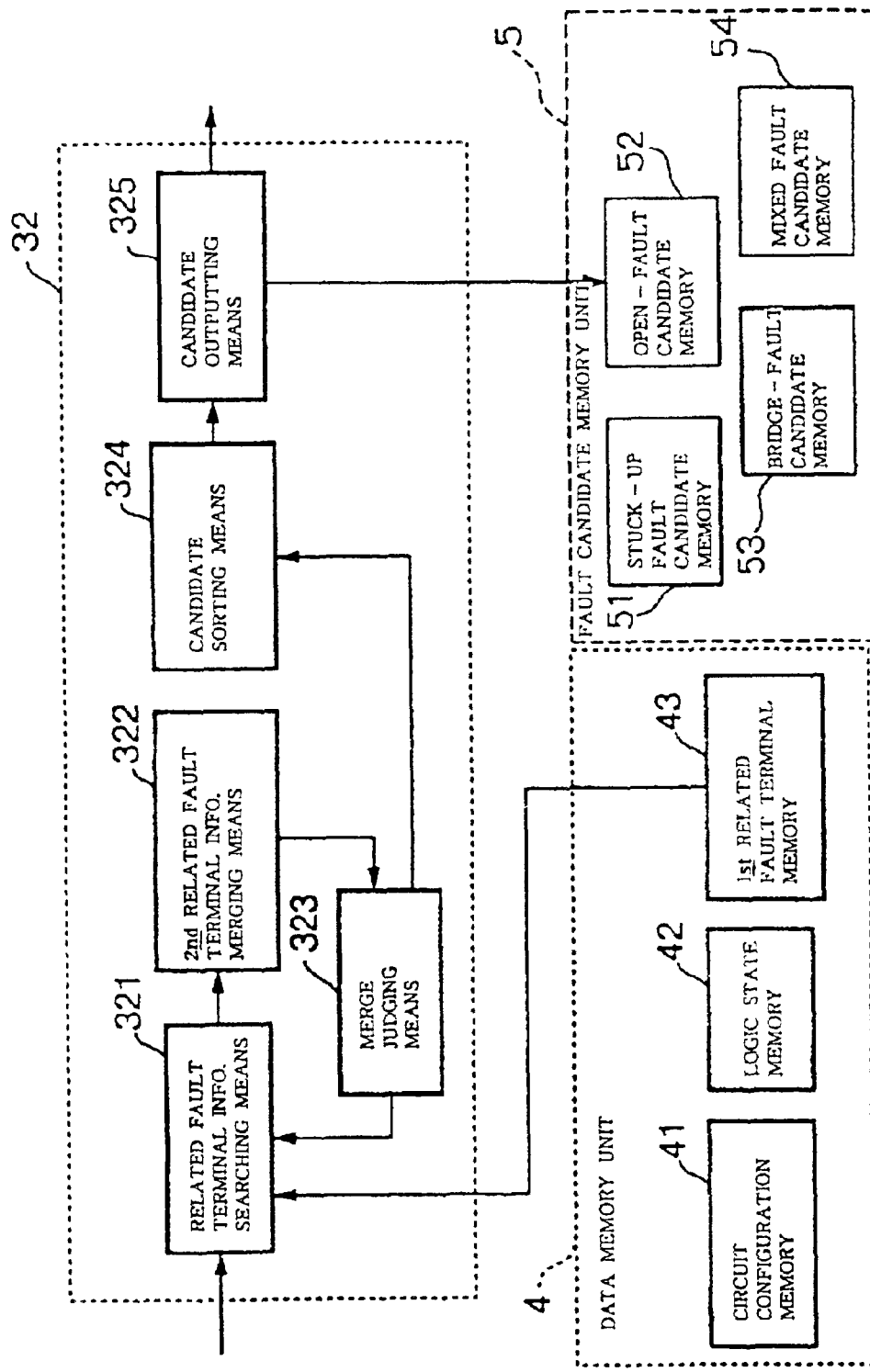
FIG. 6 is a block diagram showing the arrangement of an open-fault weighting means together with the data memory unit and the fault candidate memory unit.

Turning to FIG. 6 of the drawings, the open-fault weighting means 32 includes a related fault terminal information searching means 321, a second related fault terminal information merging means 322, a merge judging means 323, a candidate sorting means 324 and candidate outputting means 325. The related fault terminal information searching means 321 searches the first related fault terminal memory 43 for the pieces of related fault terminal information representative of the fault terminals of nodes on the fault propagation paths at a given time.

The second related fault terminal information merging means 322 makes the pieces of related fault terminal information representative of the nodes on the fault propagation paths at a certain time merged with the pieces of related fault terminal information representative of the same nodes. The merge judging means 323 monitors the merging work to see whether or not the second related fault terminal information merging means 322 completes the merging work for all the given times. The candidate sorting means 324 is operative to sort the candidates of the open-fault with the number of related fault terminals, which is determined by the second related fault terminal information merging means 322, as the weight. The candidate sorting means 324 forms a list of the candidates of the open fault. The candidate outputting means 325 delivers the pieces of open-fault candidate information representative of the list and the related fault terminals to the open-fault candidate memory 52 and the output unit 6.

Figure 7:
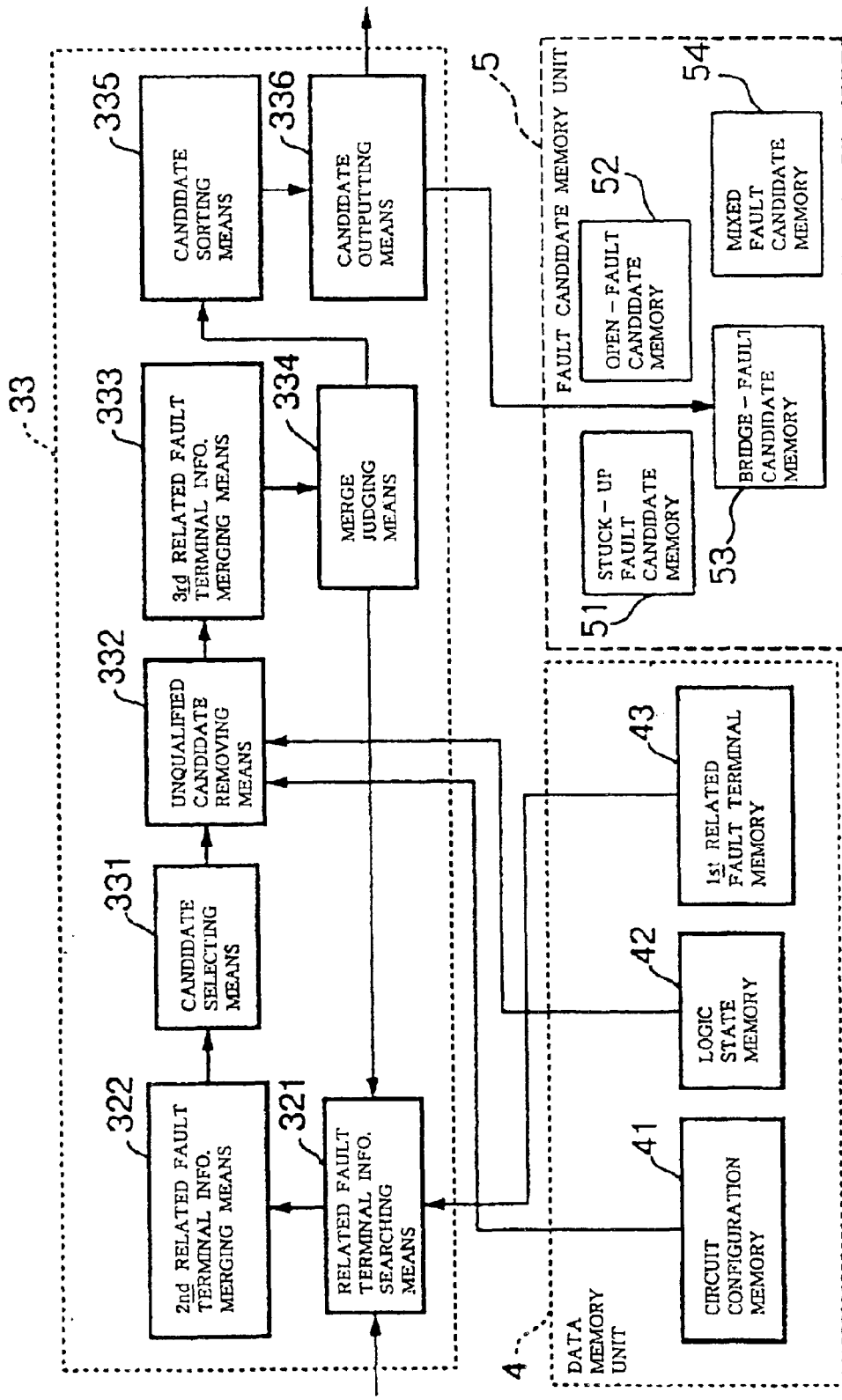
FIG. 7 is a block diagram showing the arrangement of a bridge-fault weighting means together with the data memory unit and the fault candidate memory unit.

Turing to FIG. 7 of the drawings, the bridge-fault weighting means 33 includes the related fault terminal information searching means 321, the second related fault terminal information merging means 322, a candidate selecting means 331, an unqualified candidate removing means 332, a third related fault terminal information merging means 333, a merge judging means 334, a candidate sorting means 335 and a candidate outputting means 336. The related fault terminal information searching means 321 and the second related fault terminal information merging means 322 have been already described in connection with the open-fault weighting means 32.

The candidate selecting means 331 selects two candidates from the candidates of the open-fault. The two candidates are paired with each other, and form a candidate pair. The candidate selecting means 331 forms plural candidate pairs. The unqualified candidate removing means 332 checks the plural candidate pairs to see whether or not each candidate pair meets the conditions of the bridge-fault, and eliminates unqualified candidates from the plural candidate pairs. The unqualified candidates do not meet the conditions of the bridge-fault.

The third related fault terminal information merging means 333 merges the pieces of related terminal information representative of each candidate pair with one another. The merge judging means 334 is operative to see whether or not the third related fault terminal information merging means 333 completes the merging work on all the candidate pairs. The candidate pairs processed by the third related fault terminal information merging means 333 are candidates of the bridge-fault.

Using the number of related fault terminals of each candidate, the candidate sorting means 335 is operative to sort the candidates of the bridge-fault origin with the number of related fault terminals as the weight. The candidate sorting means 335 forms a list of the candidates of the bridge-fault. The candidate outputting means 336 delivers the pieces of bridge-fault candidate information representative of the list and the related fault terminals to the bridge-fault candidate memory 53 and the output unit 6.

Figure 8:
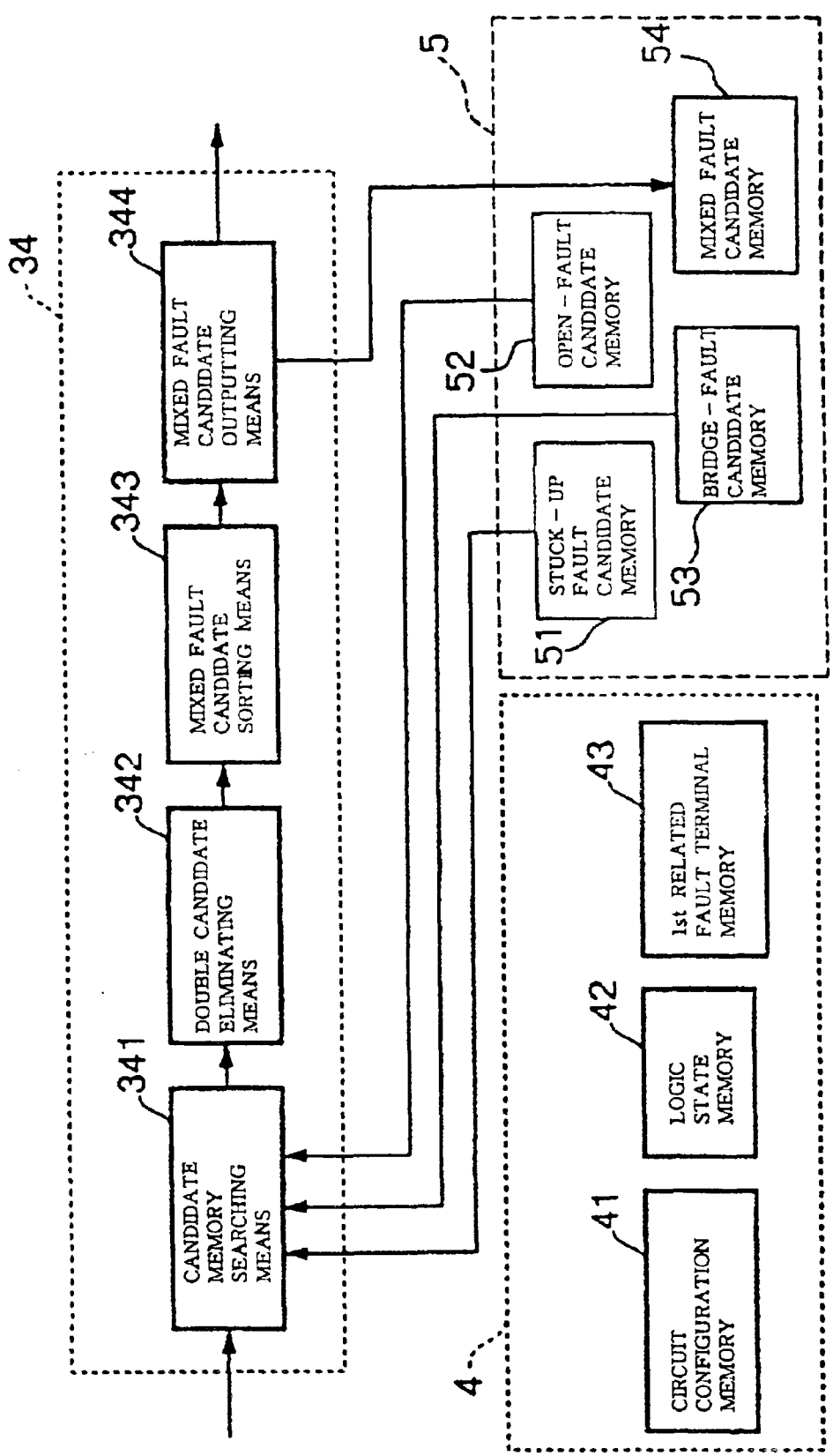
FIG. 8 is a block diagram showing the arrangement of a mixed fault candidate output means together with the data memory unit and the fault candidate memory unit.

Turning to FIG. 8 of the drawings, the mixed fault candidate output means 34 includes a candidate memory searching means 341, a double candidate eliminating means 342, a mixed fault candidate sorting means 343 and a mixed fault candidate outputting means 344. The candidate memory searching means 341 reads out the candidates of the stuck-at fault, the candidates of the open-fault and the candidates of the bridge-fault from the stuck-at fault candidate memory 51, the open-fault candidate memory 52, the bridge-fault candidate memory 53 and the mixed fault candidate memory 54, and draws up a list of mixed fault candidates.

The double candidate eliminating means 342 checks the list of the mixed fault candidates to see whether each node is listed as both of the stuck-at fault candidate and the open-fault candidate with the pieces of related fault terminal information identical with one another. If a node is listed as both of the stuck-at fault candidate and if the open-fault candidate and the pieces of related fault terminal information for the stuck-at fault candidate are identical with the pieces of related fault terminal information for the open-fault candidate, the double candidate eliminating means 342 eliminates the open-fault candidate from the list of mixed fault candidates. After the elimination of the open-fault candidates from the list, the double candidate eliminating means 342 transfers the list of mixed fault candidates to the mixed fault candidate sorting means 343.

Using the number of related fault terminals associated with each mixed fault candidate as the weight, the mixed fault candidate sorting means 343 sorts the mixed fault candidates, and modifies the list of mixed fault candidates. The mixed fault candidate outputting means 344 delivers the pieces of mixed fault candidate information representative of the list of mixed fault candidates and the related fault terminals to the mixed fault candidate memory 54 and the output unit 6.

Figure 9:
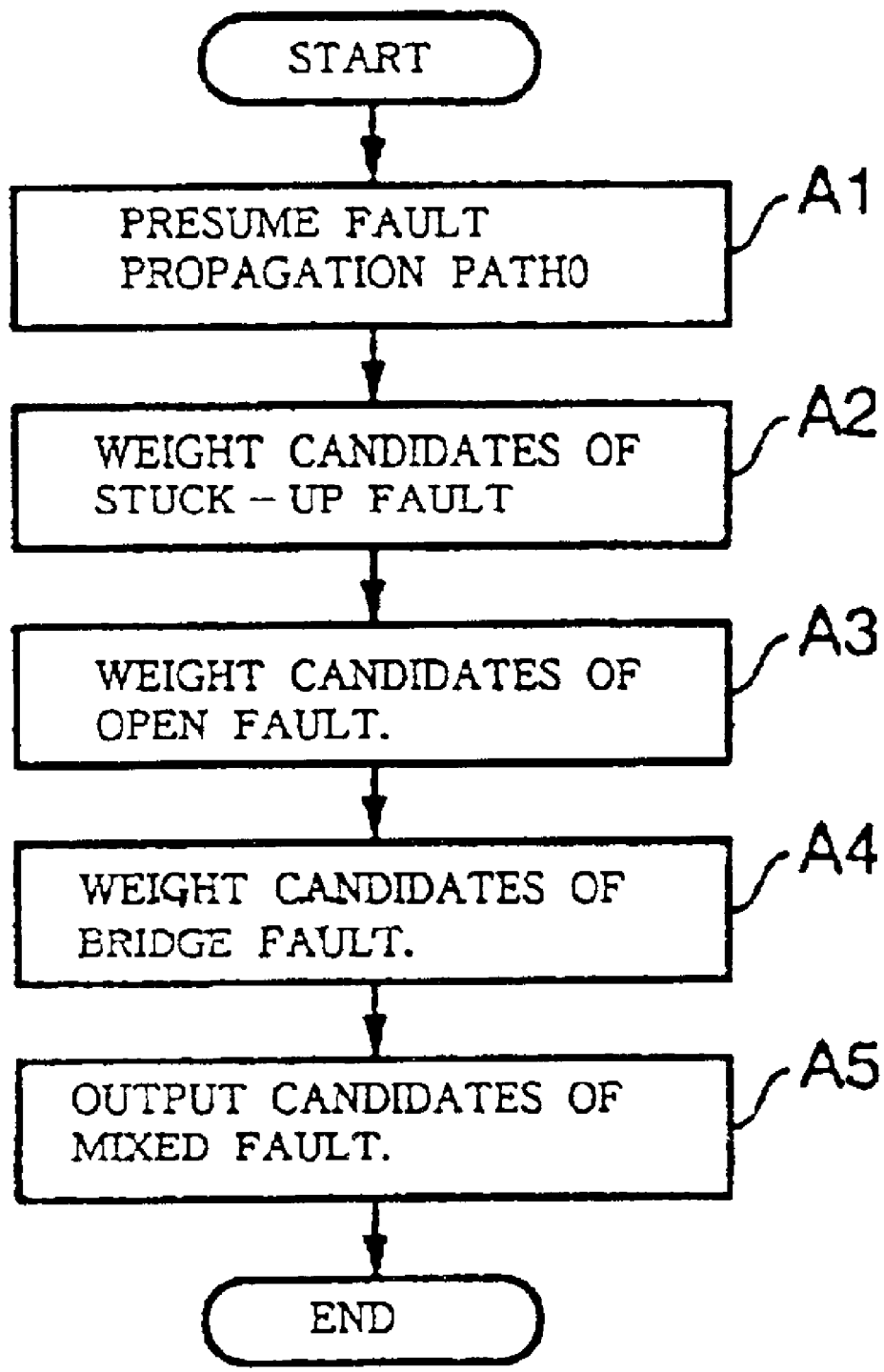
FIG. 9 is a flowchart showing a sequence of jobs executed by the fault analyzing system.

The fault analyzing system according to the present invention achieves the fault analysis through a sequence shown in FIG. 9. An integrated circuit is assumed to be analyzed. The fault analyzing system firstly renders the fault propagation path presuming unit 2 presuming fault propagation paths from the failure output terminals toward the upstream as by step A1. Subsequently, the fault analyzing system renders the stuck-at fault weighting means 31, the open-fault weighting means 32 and the bridge-fault weighting means 33 determining candidates of the stuck-at fault through the weighting as by step A2, candidates of the open-fault through the weighting as by step A3 and candidates of the bridge-fault through the weighting as by step A4. Finally, the fault analyzing system renders the mixed fault candidate output means 34 delivering the pieces of mixed fault candidate information representative of the list of the mixed fault candidates as by step A5.

The job at step A1 is hereinbelow described in detail with reference to FIGS. 4 and 10. The fault propagation path presuming unit 2 searches the data memory unit 4 for fault terminals as by step A11. Namely, the fault terminal searching means 21 accesses the pieces of data information representative of the layout of the circuit stored in the circuit configuration memory 41 and the pieces of data information representative of the logic state stored in the logic state memory 42, and determines the fault terminals. If there is not any fault terminal, the fault propagation path presuming unit 2 terminates the presumption as by step A12.

On the other hand, when the fault terminal searching means 21 finds a fault terminal or terminals, the fault terminal searching means 21 notifies the fault terminal or terminals to the partial circuit extracting means 22, and the partial circuit extracting means 22 extracts partial circuit or circuits from the integrated circuit as by step A13. Since the pieces of data information representative of the layout the circuit is stored in the circuit configuration memory 41, the partial circuit extracting means 22 can specify the partial circuit or circuits related to the fault terminal or terminals. The integrated circuit may be traced in the direction toward the output terminals and the direction toward the input terminals several times or a hierarchy for the circuit design may be used as disclosed in Japanese Patent Publication of Unexamined Application No. 10-062494. The partial circuit extracting means 22 notifies the extracted partial circuit or circuits to the internal logic state presuming means 23.

Subsequently, the internal logic state presuming means 23 accesses the pieces of data information representative of the circuit layout, which are stored in the circuit configuration memory 41, and the pieces of data information representative of the logic state at the boundaries between the partial circuits, which are stored in the logic state memory 42, and presumes the fault propagation path or paths in the extracted partial circuit or circuits as by step A14. The logic state registration means 24 stores the presumed logic state in the extracted partial circuit or circuits in the logic state memo The first related terminal registration mean 25 investigates the fault propagation path or paths presumed at step A14 for determining fault terminals related to the nodes on the fault propagation path or paths. When the fault terminals are determined, the first related terminal registration means 25 writes pieces of related fault terminal information representative of the fault terminals in the first related fault terminal memory 43 as by step A16.

Upon completion of the registration of the fault terminals, the fault analyzing system returns to step A11, and reiterates the loop consisting of steps A11 to A16 until the answer at step A12 is changed to negative.

Figure 11:
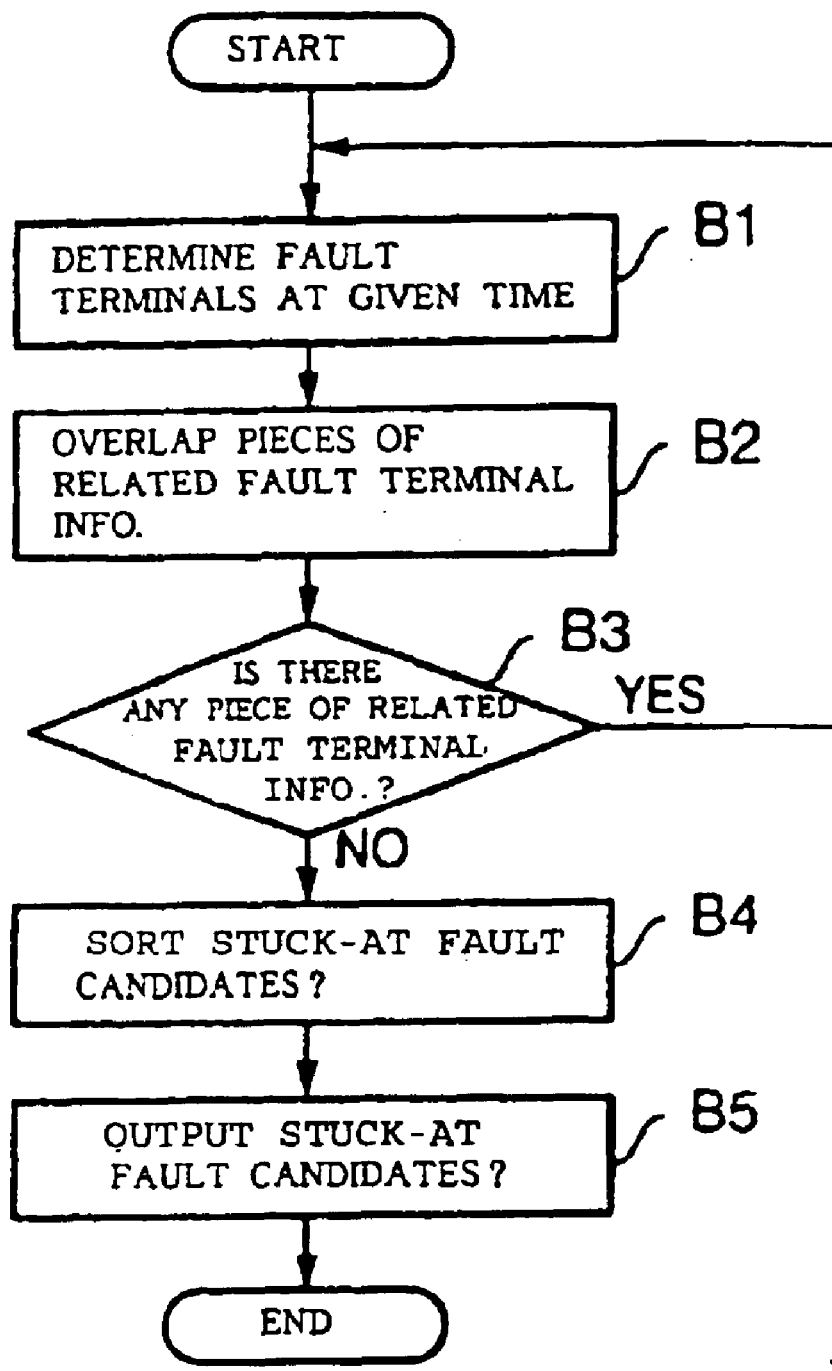
FIG. 11 is a flowchart showing a sequence of jobs executed by the stuck-at fault weighting means.

The job at step A2 is hereinbelow described in detail with reference to figures 5 and 11. In the following description, a0 and a1 represents a stuck-at fault fixed to logic level and a stuck-at fault fixed to logic level, respectively.

The related fault terminal information searching means 311 accesses the pieces of related fault terminal information representative of the fault terminals, and determines pieces of related fault terminal information representative of the fault terminals related to the nodes on the fault propagation path or paths at a given time and the next time as by step B1. The first related fault terminal information merging means 312 merges the pieces of related fault terminal information at each node as by step B2 in so far as the logic state is unchanged. Node A is assumed to be on the failure propagation path at time T2 as well as time T1 without changing the logic state such as logic level. If the expected logic state is logic level, the fault terminal related to the stuck-at candidate A-sa0 is presumed by merging the piece of related fault terminal information at time T1 with the piece of related fault terminal information at time T2. However, if the logic state is different between time T1 and time T2, the first related fault terminal information merging means 312 does not merge those pieces of related fault terminal information, because the pieces of related fault terminal information are assumed to represent different faults A-sa0 and A-sa1.

Subsequently, the merge judging means 313 determines whether or not the first related fault terminal information merging means 312 processes the pieces of related fault terminal information at the latest time as by step B3. If the answer at step B3 is given affirmative, the fault candidate weighting unit 3 returns to step B1, and reiterates the loop consisting of steps B1 to B3 until the answer at step B3 is changed to negative.

When the pieces of related fault terminal information representative of the fault terminals at the latest time are processed at step B2, the answer at step 23 is given negative, and the candidate sorting means 314 sorts the up stuck-at fault candidates with the number of related fault terminals used as the weight as by step B4. As a result, the candidate sorting means 314 draws up a list of stuck-at fault candidates. Finally, the candidate outputting means 315 delivers the pieces of stuck-at fault candidate information representative of the list of stuck-at fault candidates and the related fault terminals to the output unit 6, and stores them in the stuck-at fault candidate memory 51 as pieces of stuck-at fault candidate information.

Figure 12:
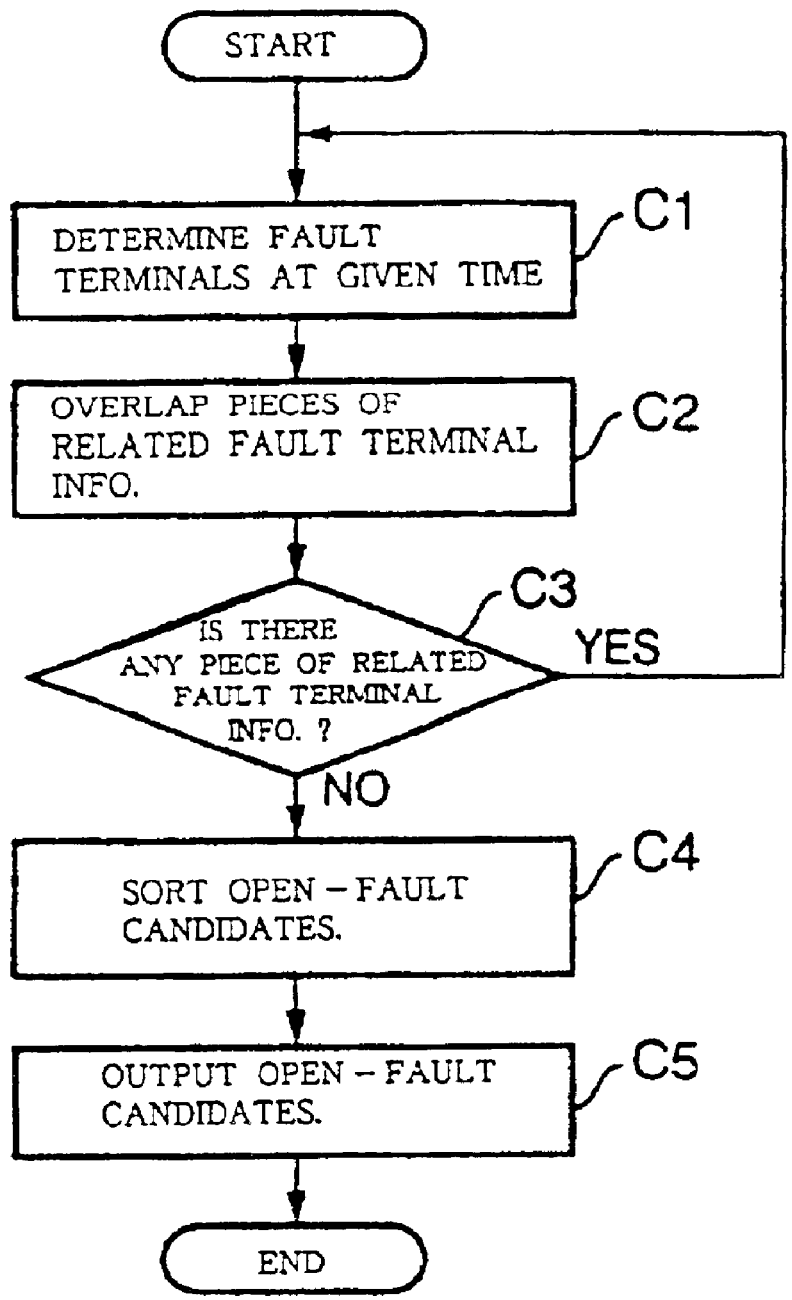
FIG. 12 is a flowchart showing a sequence of jobs executed by the open-fault weighting means.

The job at step A3 is hereinbelow described in detail with reference to FIGS. 6 and 12. The related fault terminal information searching means 321 searches the first related fault terminal memory 43 for pieces of related fault terminal information representative of the fault terminals related to the nodes on the fault propagation paths at a given time and the next time as by step C1. The pieces of related fault terminal information read out from the first related fault terminal memory 43 are transferred to the second related fault terminal information merging means 322. The second related fault terminal information merging means 322 merges the pieces of related fault terminal information as by step C2. For example, node A is assumed to be on the fault propagation path at time T1 and the next time T2. Related fault terminals of the open-fault candidate "A-open", which represents the node A as an open-fault candidate, is obtained by merging the pieces of related fault terminal information at time T1 and the pieces of related fault terminal information at time T2.

Upon completion of the merging, the merge judging means 323 checks the pieces of related fault terminal information already read out to see whether or not the pieces of fault terminal information at the latest time has been processed as by step C3. If the answer at step C3 is given affirmative, the fault candidate weighting unit 3 returns to step C1, and reiterates the loop consisting of steps C1 to C3 until the answer at step C3 is changed to negative.

When the pieces of related fault terminal information representative of the fault terminals at the latest time are processed at step C2, the answer at step C3 is given negative, and the candidate sorting means 324 sorts the open-fault candidates with the number of related fault terminals used as the weight as by step C4. As a result, the candidate sorting means 324 draws up a list of open-fault candidates. Finally, the candidate outputting means 325 delivers the pieces of open-fault candidate information representative of the list of open-fault candidates and the related fault terminals to the output unit 6, and stores them in the open-fault candidate memory 52 as pieces of open-fault candidate information.

Figure 13:
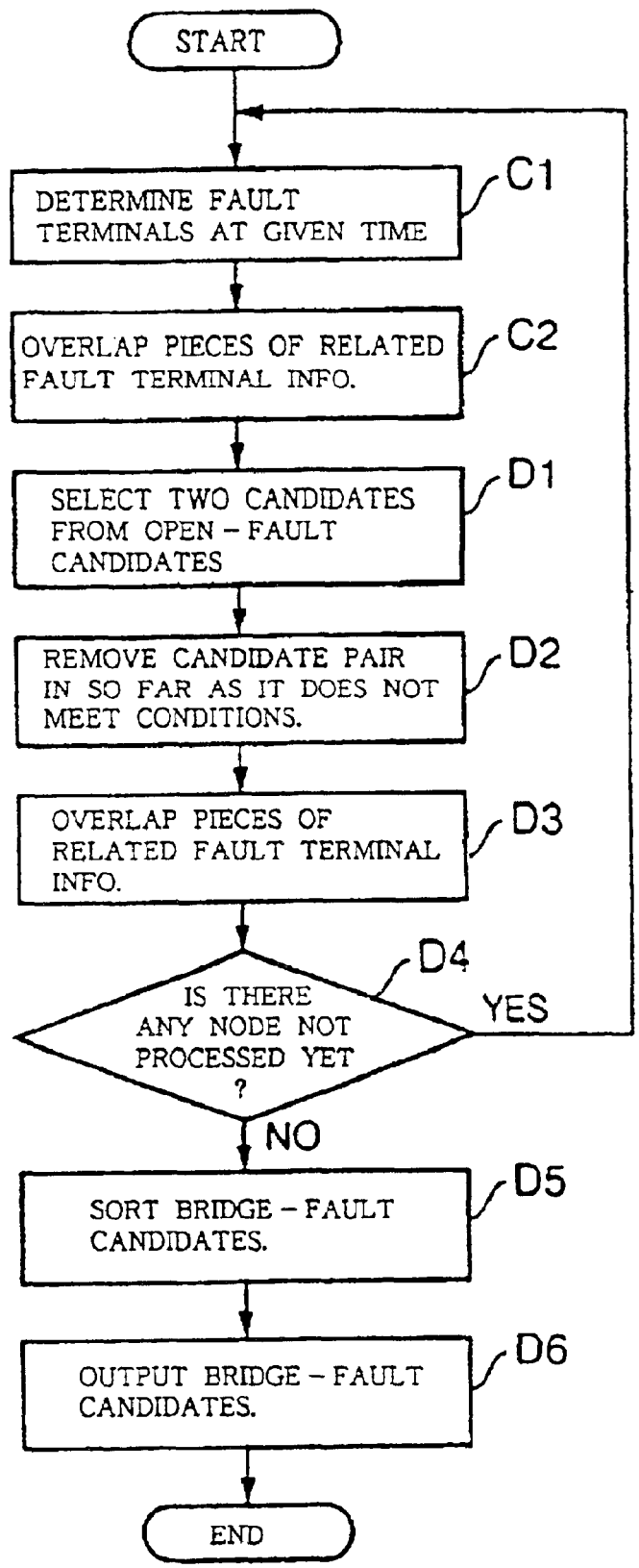
FIG. 13 is a flowchart showing a sequence of jobs executed by the bridge-fault weighting means.

The job at step A4 is hereinbelow described in detail with reference to figures 7 and 13. The related fault terminal information searching means 321 searches the first related fault terminal memory 43 for pieces of related fault terminal information representative of the fault terminals related to the nodes on the failure propagation path or paths at a given time and the next time as by step C1, and the second related fault terminal information merging means 322 merges the pieces of related fault terminal information at the given time and the pieces of related fault terminal information at the next time as by step C2. Thus, the jobs at the first two steps are similar to those in the flowchart shown in FIG. 12.

Subsequently, candidate selecting means 331 selects two candidates from the open-fault candidates listed at step C2, and forms a candidate pair as by step D1. The unqualified candidate removing means 332 checks the candidate pair to see whether or not it meets conditions of a bridge-fault candidate, and removes the candidate pair in so far as it does not meet the conditions as by step D2. If the expected logic state is same at a time at which the fault takes place, the candidate pair is not any origin of the bridge-fault, and the candidate pair is removed. If the candidates of the pair does not cross in the layout of the circuit layout, the candidate pair is not any origin of the bridge-fault. Even if the pieces of related fault terminal information are merged with one another, the number of fault terminals may be small. The candidate pair is rarely an origin of the bridge fault, and the candidate pair is removed. Moreover, if one of the candidates of the pair contains all the fault terminals, the candidate is possibly listed as the stuck-at fault candidate or the open-fault candidate, and it is removed. As a result, the bridge-fault weighting means is released from unnecessary jobs described hereinbelow. Thus, only candidate pair at a high possibility remains as a candidate of bridge-fault.

Subsequently, the third related fault terminal information merging means 333 merges the pieces of related fault terminal information representative of one of the candidates of the pair and the pieces of related fault terminal information representative of the other candidate of the pair as by step D3. Node A is assumed to be paired with node B. As described hereinbefore, the nodes A and B are selected from the open-fault candidates, and, accordingly, are represented as A-open and B-open, respectively. The related fault terminals of the bridge-fault candidate pair AB-bf are obtained by merging the pieces of related fault terminal information representative of A-open and the pieces of related fault terminal information representative of B-open.

Subsequently, the merge judging means 334 determines whether or not the third related fault terminal information merging means 333 processes the pieces of related fault terminal information representative of the last pair as by step D4. If the answer at step D4 is given affirmative, the bridge-fault weighting means 33 returns to step C1, and reiterates the loop consisting of steps C1 to D4 until the answer at step D4 is changed to negative.

When the third related fault terminal information merging means 333 completes the data processing on the pieces of related fault terminal information representative of the last pair, the answer at step D4 is given negative, and the candidate sorting means 335 sorts the bridge-fault candidates with the number of related fault terminals used as the weight as by step D5. As a result, the candidate sorting means 335 draws up a list of bridge-fault candidates. Finally, the candidate outputting means 336 delivers the pieces of bridge-fault candidate information representative of the list of bridge-fault candidates and the related fault terminals to the output unit 6, and stores them in the bridge-fault candidate memory 53 as pieces of bridge fault candidate information as by step D6.

Figure 14:
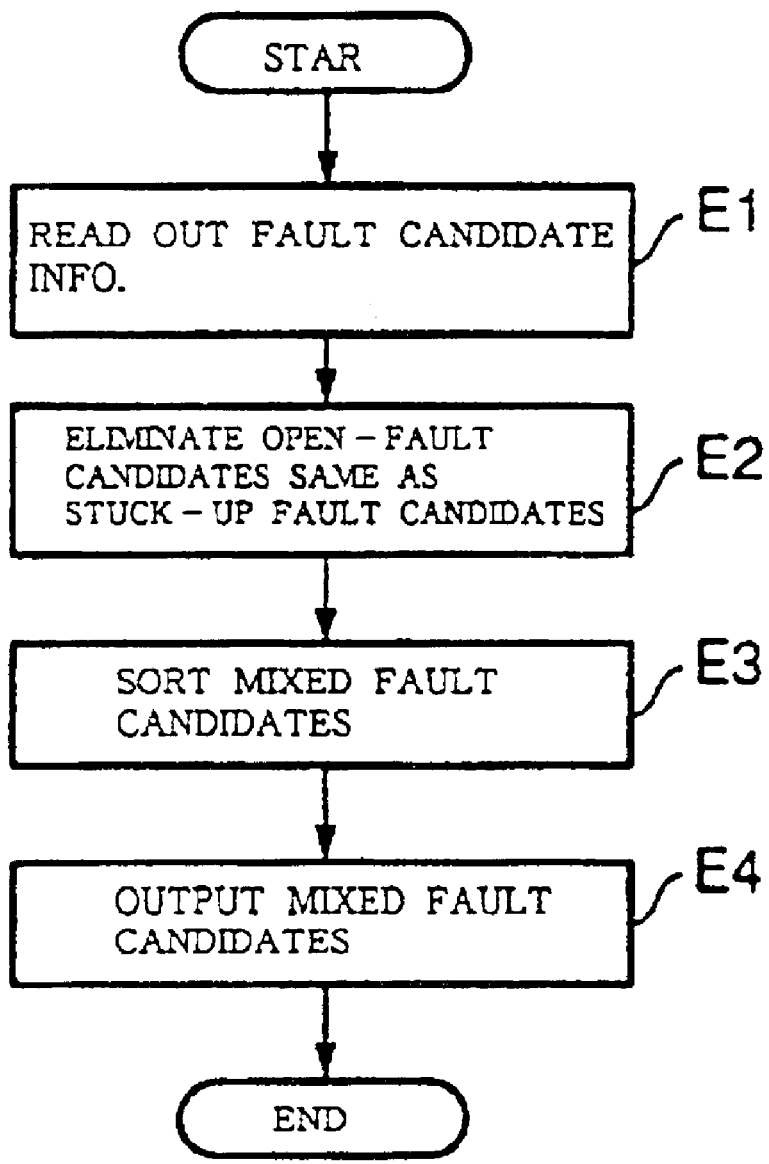
FIG. 14 is a flowchart showing a sequence of jobs executed by the mixed fault candidate output means.

The job at step A5 is hereinbelow described in detail with reference to FIGS. 8 and 14. The candidate memory searching means 341 reads out the pieces of stuck-at fault candidate information representative of the list of stuck-at candidates and the related fault terminals, the pieces of open-fault candidate information representative of the list of open-fault candidates and the related fault terminals and the pieces of bridge-fault candidate information representative of the list of bridge-fault candidates and the related failure terminals from the stuck-at fault candidate memory 51, the open-fault candidate memory 52 and the bridge-fault candidate memory 53 as by step E1, and draws a list of mixed fault candidates. The double candidate eliminating means 342 checks the list of mixed fault candidates to see if there are an open-fault candidate and a stuck-at fault candidate both relating to a node and having the pieces of related fault terminal information shared therebetween, and eliminates the open-fault candidate from the list of mixed fault candidates with the positive answer as by step E2.

As described hereinbefore, the difference between the stuck-at fault candidate and the open-fault candidate is whether the logic state is to be taken into account or not. In other words, the pieces of related fault terminal information representative of the open-fault candidate A-open is equivalent to the pieces of related fault terminal information representative of the stuck-up fault candidates A-sa0 and A-sa1 ORed with each other. In case where only the stuck-at fault candidate A-sa0 is found in the list of stuck-at candidates, the stuck-at fault candidate A-sa0 is substantially identical with the open-fault candidate A-open, and the same pieces of related fault terminal information are shared between the stuck-at fault candidate A-sa0 and the open-fault candidate A-open. In this situation, if both of the stuck-at fault candidate A-sa0 and the open-fault candidate A-open are written into the list of mixed fault candidates, the piece of stuck-at fault candidate information is doubled with the piece of open-fault candidate information. In order to reduce the pieces of mixed fault candidate information, the double candidate eliminating means 342 eliminates the pieces of open-fault candidate information from the list of mixed fault candidates.

Subsequently, mixed fault candidate sorting means 343 sorts the mixed fault candidates in the list with the number of fault terminals related thereto as the weight as by step E3. As a result, another list of mixed fault candidates is obtained. The mixed fault candidate outputting means 344 delivers the pieces of mixed fault candidate information representative of the list of mixed fault candidates and the related fault terminals obtained at step E3 to the output unit 6, and writes pieces of mixed fault candidate information representative of the mixed fault candidates in the mixed fault candidate memory 54.

Figure 1:
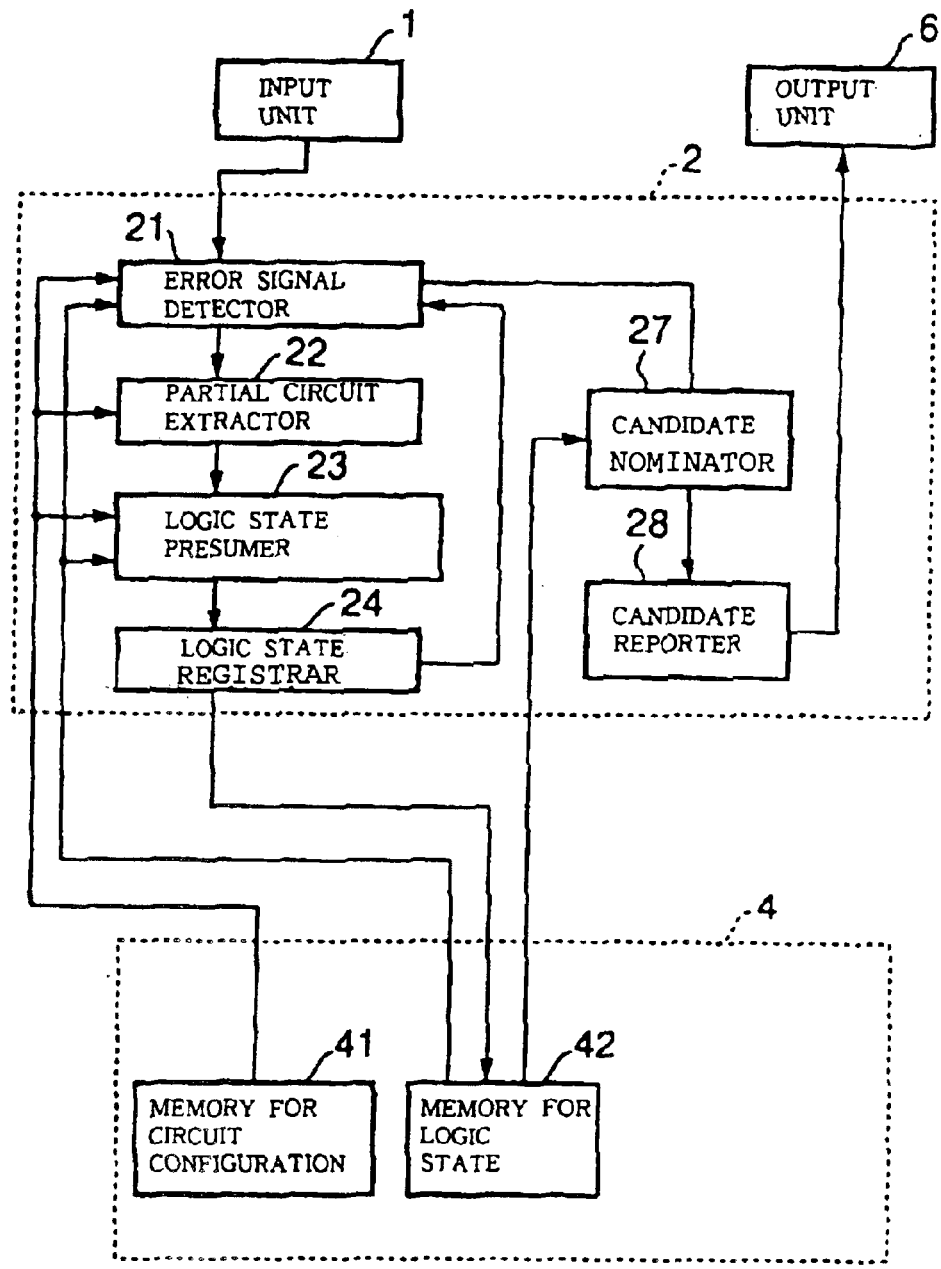
FIG. 1 is a block diagram showing the arrangement of the prior art failure analyzing system.
Figure 2:
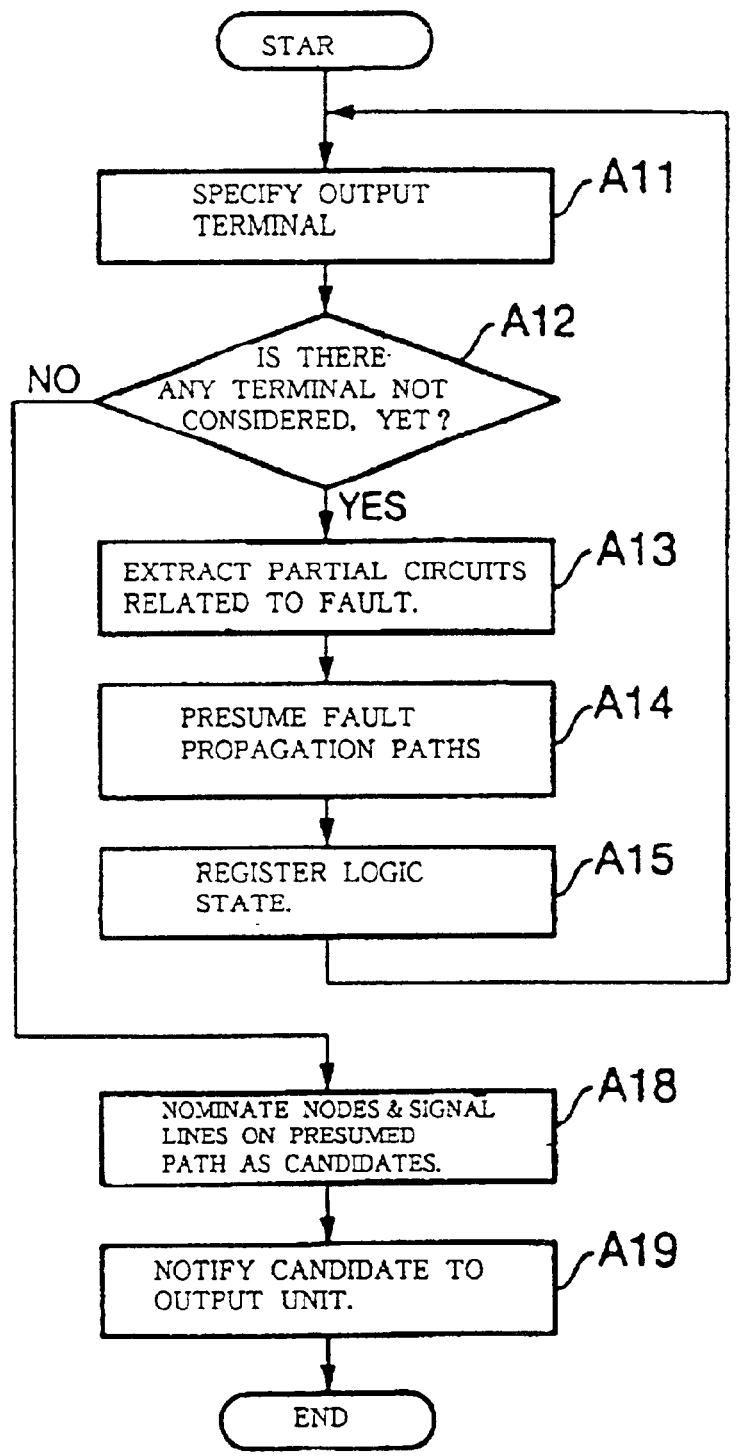
FIG. 2 is a flowchart showing the sequence of the prior art presumption.
Figure 3:
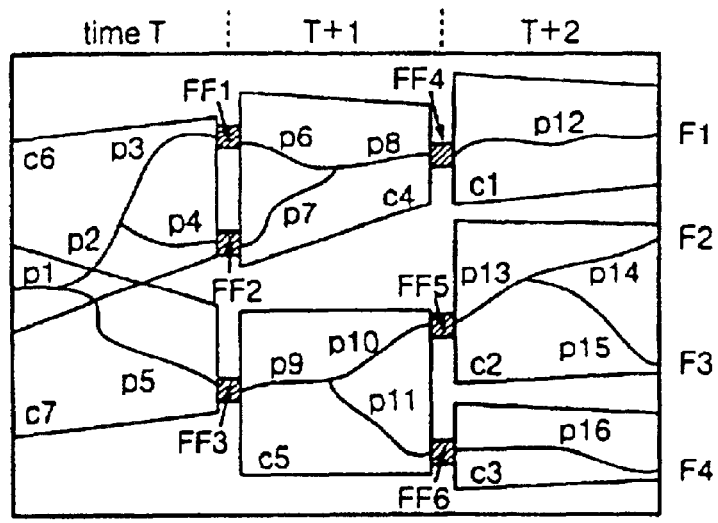
FIG. 3 is a schematic view showing the image of the integrated circuit to be analyzed.
Figure 10:
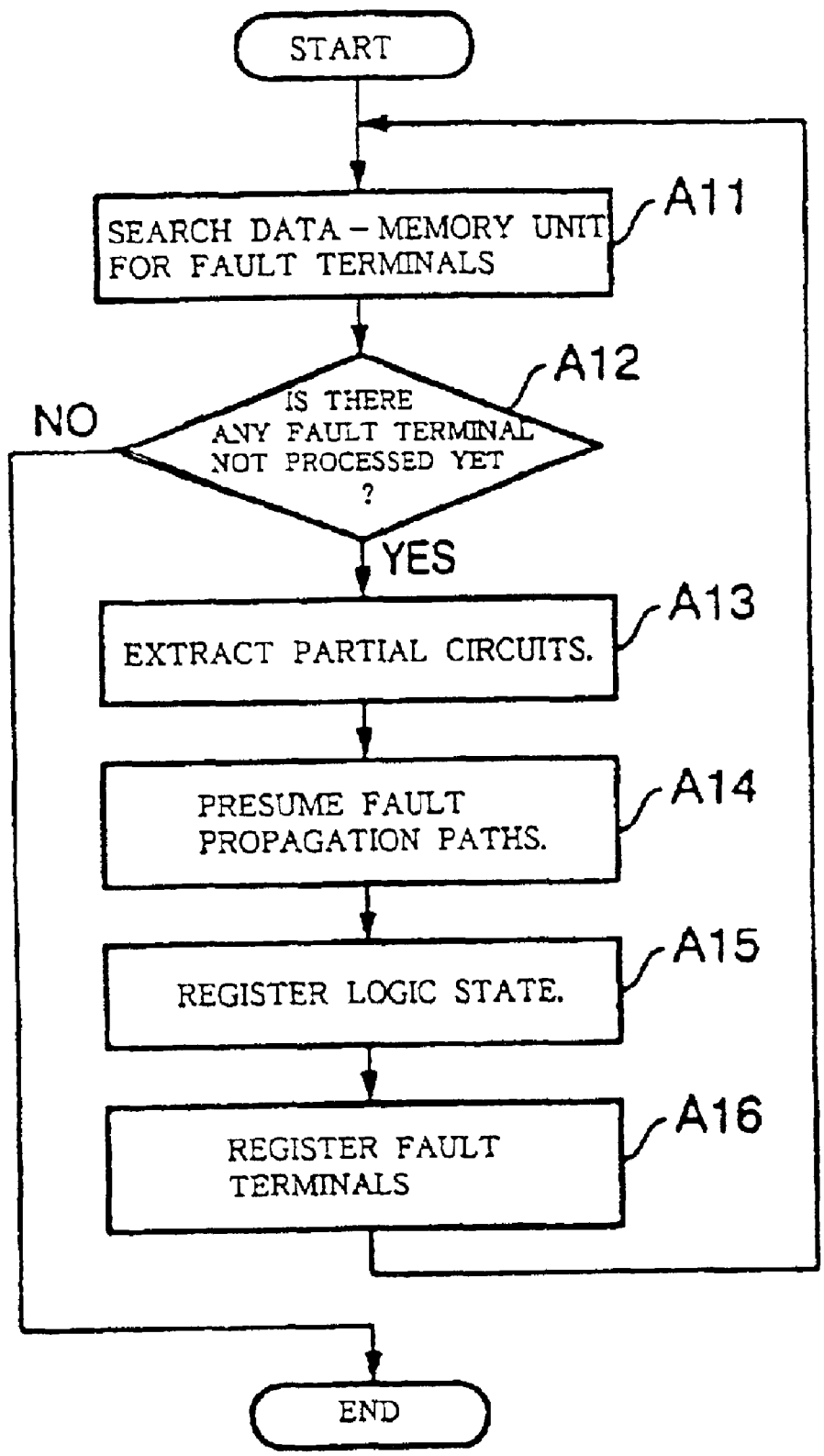
FIG. 10 is a flowchart showing a sequence of jobs executed by a fault propagation path presuming unit incorporated in the fault analyzing system.

Assuming now that the fault propagation paths are presumed as shown in FIG. 3, the fault propagation path presuming unit 2 executes the jobs shown in FIG. 10. The sequential circuit shown in FIG. 3 includes the six flip-flops FF1, FF2, FF3, FF4, FF5 and FF6. The fault terminals F1, F2, F3 and F4 are found at time T+2. In other words, the fault terminal searching means 21 accesses the pieces of data information representative of the circuit layouts and the pieces of data information representative of the logic state, and specifies the fault terminals F1, F2, F3 and F4 at step A11. The fault terminals F1 to F4 render the answer at step A12 positive, and the partial circuit extracting means 22 checks the pieces of data information stored in the circuit configuration memory 41 to see what partial circuits relate to the fault terminals F1 to F4. The partial circuit extracting means 22 specifies the partial circuits c1, c2 and c3 at step A13. The partial circuits have the boundary defined by the flip flop circuits.

Subsequently, the internal logic state presuming means 23 accesses the pieces of data information representative of the circuit layouts and the pieces of data information representative of the logic state in the extracted partial circuits, and presumes fault propagation paths at step A14. The internal logic state presuming means 23 presumes p12, p13/p14/p15 and p16 fault propagation paths in the partial circuit c1, the partial circuit c2 and the partial circuit c3 at step A14.

The logic state registration means 24 stores pieces of data information representative of the logic state in the partial circuits presumed at step A14 into the logic state memory 42 at step A15. Moreover, the flip flops first related fault terminal FF4, FF5 and FF6 are specified as fault terminals at time T+1.

The first related terminal registration means 25 stores pieces of related fault terminal memory 43 at step A16. In detail, the first first related fault terminal registration means 24 stores a piece of related fault terminal information representative of the fault terminal F1 related to the node on the fault propagation path p12 in the partial circuit c1, pieces of related fault terminal information representative of the fault terminals F2 and F3 related to the node on the propagation path p13 in the partial circuit c2, a piece of related fault terminal information representative of the fault terminal F2 related to the node on the propagation path p14 in the partial circuit c2, a piece of related fault terminal information representative of the fault terminal F3 related to the node on the propagation path p15 in the partial circuit c2 and a piece of related fault terminal information representative of the fault terminals F4 related to the node on the propagation path p16 in the partial circuit c3 in the first related fault terminal memory 43.

The fault propagation path presuming unit 2 returns to step A11, and the fault terminal searching means 21 searches the memories for fault terminals not processed yet. The fault terminal searching means 21 specifies the fault terminals FF4, FF5 and FF6. Thus, the fault propagation path presuming unit 2 repeats the jobs at steps A11 to A16, and presumes fault propagation paths p1 to p16 in partial circuits c1 to c7.

When the answer at step A12 is changed to the negative answer, the pieces of related fault terminal information stored in the related fault terminal memory 43 represent the fault terminal F1 on the fault propagation path p12 in the partial circuit c1, the fault terminals F2 and F3 on the fault propagation path p13 in the partial circuit c2, the fault terminal F2 on the fault propagation path p14 in the partial circuit c2, the fault terminal F3 on the fault propagation path p15 in the partial circuit c2, the fault terminal F4 on the fault propagation path p16 in the partial circuit c3, the fault terminal F1 on the fault propagation path p6 in the partial circuit c4, the fault terminal F1 on the fault propagation path p7 in the partial circuit c4, the fault terminal F1 on the fault propagation path p8 in the partial circuit c4, the fault terminals F2, F3 and F4 on the fault propagation path p9 in the partial circuit c5, the fault terminal s F2 and F3 on the fault propagation path p10 in the partial circuit c5, the fault terminal F4 on the fault propagation path p11 in the partial circuit c5, the fault terminal F1 on the fault propagation path p1 in the partial circuit c6, the fault terminal F1 on the fault propagation path p2 in the partial circuit c6, the fault terminal F1 on the fault propagation path p3 in the partial circuit c6, the fault terminal F1 on the fault propagation path p4 in the partial circuit c6, the fault terminals F2, F3 and F4 on the fault propagation path p1 in the partial circuit c7 and the fault terminals F2, F3 and F4 on the fault propagation path p5 in the partial circuit c7.

Figure 15:
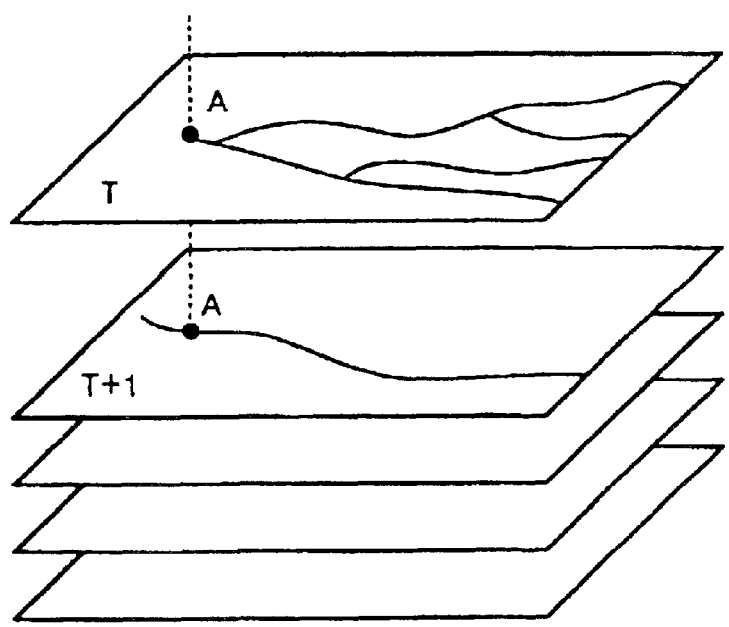
FIG. 15 is a schematic view showing time planes merged with one another.

The nodes on the failure propagation paths thus assumed possibly propagate the fault as well as the candidates of the fault origin where the fault takes place. The pieces of related fault terminal information are merged with one another in various manners, and, accordingly, various lists are obtained through the merging. The pieces of related fault terminal information are, by way of example, merged with one another in order of time as shown in FIG. 15.

Figure 16:
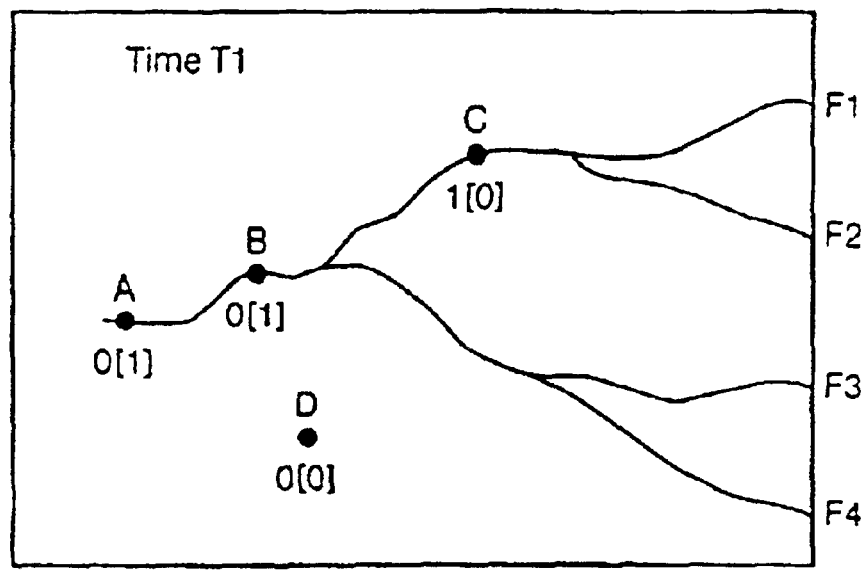
FIG. 16 is a view showing one of the time planes.
Figure 17:
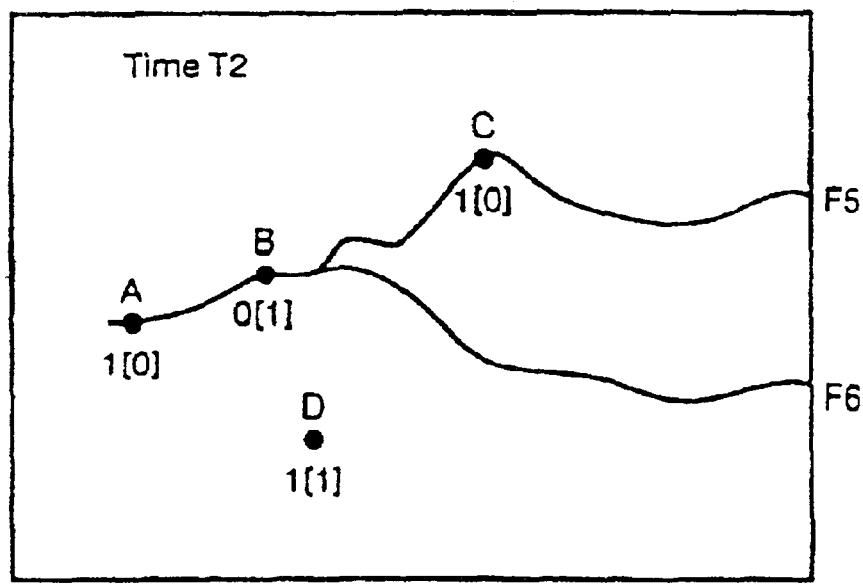
FIG. 17 is a view showing another time plane.
Figure 18:
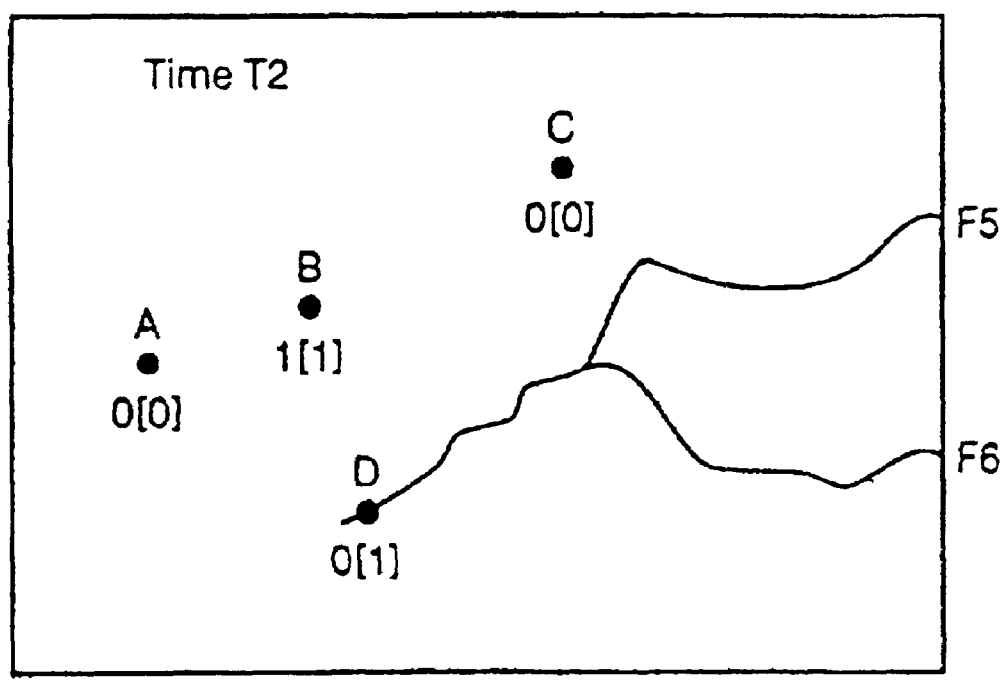
FIG. 18 is a view showing the time plane same as that shown in FIG. 17.

Nodes A, B, C and D are assumed to be found on failure propagation paths in time planes T1 and T2 through the presumption as shown in FIGS. 16, 17 and 18. FIGS. 17 and 18 show the time planes concurrently produced. The expected logic state at these nodes A, B, C and D is placed in the brackets. The stuck-at fault weighting means 31 firstly gives weights to the nodes A, B, C and D as follows. The related fault terminal information searching means 311 searches the first related fault terminal memory 43 for the fault terminals on the fault propagation paths at step B1 (see FIG. 11). The related fault terminal information searching means 311 presumes that a stuck-at fault is propagated from the stuck-at fault candidate A-sa0 to F1, F2, F3 and F4, from the stuck-at fault candidate B-sa0 to F1, F2, F3 and F4 and from the stuck-at fault candidate C-sa1 to F1 and F2 at time T1 as shown in figure 16. The related fault terminal information searching means 311 further presumes that the stuck-at fault candidates A-sa1, B-sa0 and C-sa1 respectively relate to F5/F6, F5/F6 and F5 at time T2 as shown in FIG. 17.

The first related fault terminal information merging means 312 merges the pieces of related fault terminal information representative of the nodes at time T1 with the pieces of related fault terminal information representative of the nodes at time T2 at step 32 on the condition that the logic state is identical between time T1 and time T2. Only the stuck-at fault candidates A and B keep the logic state. As a result, the first related fault terminal information merging means 312 obtains pieces of related fault terminal information representative of F1, F2, F3, F4, F5 and F6 related to the node B and pieces of related fault terminal information representative of F1, F2 and F5 related to the node C.

The merge judging means 313 investigates whether or not the first related fault terminal merging means 312 completes the job on all the time planes, and finds the time plane at time T2 shown in FIG. 18 not to be processed. The stuck-up fault weighting means 31 returns to step B1. The related fault terminal information searching means 311 searches the first related fault terminal memory 43 for the pieces of related fault terminal information at time T2, and reads out the pieces of related fault terminal information representative of F5 and F6 related to the node D-sa0. The first related fault terminal information merging means 312 further merges the pieces of related fault terminal information at step B2. The first related fault terminal information merging means 312 presumes that the stuck-up fault candidates A-sa0, B-sa0, C-sa1, A-sa1 and D-sa0 relate to F1/F2/F3/F4, F1/F2/F3/F4/F5/F6, F1/F2/F5, F5/F6 and F5/F6, respectively.

The merge judging means 313 finds that there remains no time plane at step B3, and the candidate sorting means 314 sorts the stuck-at fault candidates with the number of related fault terminals used as the weight at step 24. The stuck-at fault candidate B-sa0 relating to F1, F2, F3, F4, F5 and F6, the stuck-at fault candidate A-sa0 relating to F1, F2, F3 and F4, the stuck-at fault candidate C-sa1 relating to F1, F2 and F5, the stuck-at fault candidate A-sa1 relating to F5 and F6 and the stuck-at fault candidate D-sa0 relating to F5 and F6 are listed in this order.

Finally, the candidate outputting means 315 delivers the pieces of stuck-at fault candidate information representative of the list and the related fault terminals to the output unit 6 and the stuck-at fault candidate memory 51 at step B5.

Subsequently, the job at step A3 (see FIG. 9) is detailed with reference to FIGS. 16 to 18. The related fault terminal information searching means 321 searches the first related fault terminal memory 43 for nodes on the fault propagation paths at step C1. An open-fault is possibly propagated from the open-fault candidate A-open to F1, F2, F3 and F4, from the open-fault candidate B-open to F1, F2, F3 and F4 and from the open-fault candidate C-open to F1 and F2 in the time plane T1 shown in FIG. 16. On the other hand, the open-fault is possibly propagated from the open-fault candidate A-open to F5 and FE, from the open-fault candidate B-open to F5 and FE and from the open-fault candidate C-open to F5 in the time plane T2 shown in FIG. 17.

The second related fault terminal information merging means 322 merges the pieces of related fault terminal information representative of the time plane T1 with the pieces of related fault terminal information representative of the time plane T2 at step C2 when the logic state is identical between the time plane T1 and the time plane T2. This results in that the open-fault candidates A-open, B-open, C-open relate to F1/F2/F3/F4/F5/F6, F1/F2/F3/F4/F5/F6 and F1/F2/F5, respectively. The merge judging means 323 investigates whether or not the second related fault terminal information merging means 322 completes the merging on all the time planes at step C3. The time plane T2 shown in FIG. 18 is still left, and the open-fault weighting means 32 returns to step C1. The open fault weighting means 32 executes the jobs at steps C1 and C2. The related fault terminal information searching means 321 presumes that D-open relates to F5 and F6, and the second related fault terminal information merging means 322 further merges the pieces of related fault terminal information representative of the time plane T2 shown in FIG. 18, and the open-fault candidates A-open, B-open, C-open and D-open are related to F1/F2/F3/F4/F5/F6, F1/F2/F3/F4/F5/F6, F1/F2/F5 and F5/F6, respectively.

The candidate sorting means 324 sorts the open-fault candidates A-open, B-open, C-open and D-open with the number of related fault terminals, and draws a list of open-fault candidates at step C4. The open-fault candidate A-open relates to the six related fault terminals F1, F2, F3, F4, F5 and F6, and stands first on the list. Similarly, the open-fault candidate B-open relates to the six related fault terminals F1, F2, F3, F4, F5 and F6, and stands second on the list. The open-fault candidates C-open and D-open relate to the three fault terminals F1, F2 and F5 and the two fault terminals F5 and F6, and stand third and fourth on the list. Finally, the candidate outputting means 325 delivers the pieces of open-fault candidate information representative of the list and the related fault terminals to the output unit 6, and write them into the open-fault candidate memory 52 at step C4.

The job at step A4 is hereinbelow described in detail with reference to FIGS. 16 to 18. First, the related fault terminal information searching means 321 searches the first related fault terminal memory 43 for the pieces of related fault terminal information representative of the time planes T1 and T2. An open-fault is possibly propagated from the open-fault candidate A-open to F1, F, F3 and F4, from the open-fault candidate B-open to F1, F2, F3 and F4 and from the open-fault candidate C-open to F1 and F2 in the time plane T1 shown in FIG. 16. On the other hand, the open-fault is possibly propagated from the open-fault candidate A-open to F5 and F6, from the open-fault candidate B-open to F5 and F6 and from the open-fault candidate C-open to F5 in the time plane T2 shown in FIG. 17.

The second related fault terminal information merging means 322 merges the pieces of related fault terminal information representative of the time plane T1 with the pieces of related fault terminal information representative of the time plane T2 at step C2 when the logic state is identical between the time plane T1 and the time plane T2. This results in that the open-fault candidates A-open, B-open, C-open relate to F1/F2/F3/F4/F5/F6, F1/F2/F3/F4/F5/F6 and F1/F2/F5, respectively.

Subsequently, the candidate selecting means 331 selects two open-fault candidates from the candidate list at step D1. As a result, three candidate pairs AB, AC and BC are obtained. The unqualified candidate eliminating means 332 examines the candidate pairs AB, AC and BC to see whether or not they meet the conditions of the bridge-fault candidate. If the expected logic state of one of the candidates is identical with the expected logic state of the other candidate at a time at which the fault is to take place, the unqualified candidate removing means 332 eliminates the candidate pair from the list of bridge-fault candidates. The candidates of the pair AB have the expected logic state[1] on the time plane T1, and the candidates of the pair AC have the expected logic state[0] on the time plane T2. For this reason, the unqualified candidate eliminating means 332 eliminates the candidate pairs AB and AC from the time planes T1 and T2. If one of the candidates of a pair has the related fault terminals perfectly contained by the other candidate of the same pair, the candidate has been already listed in the list of stuck-at fault candidates or the list of open-fault candidates, and, for this reason, the unqualified candidate eliminating means 332 eliminates the candidate pair. The fault terminals related to the candidate C-open are perfectly contained in the fault terminal group of the candidate A-open and the fault terminal group of the candidate B-open. For this reason, the unqualified candidate eliminating means 332 eliminates the candidate pairs AC and BC from the list of bridge-fault candidates. As a result, all the candidate pairs are eliminated from the list of bridge-fault candidate.

Although the third related fault terminal information merging means 333 is activated, there is not any candidate pair in the list of bridge-fault candidates, and the bridge-fault weighting means 33 skips step D3, and proceeds to step D4. Since the time plane T2 shown in FIG. 18 has not been processed, yet, the answer at step D4 is given affirmative, and the bridge-fault weighting means 33 returns to step C1.

Focusing the description on the time planes T1 and T2 shown in FIG. 18, the related fault terminal information searching means 321 searches the first related fault terminal memory 43 for the fault terminals related to the nodes on the failure propagation path. The open-fault candidates A-open, B-open and C-open relate to the fault terminals F1/F2/F3/F4, F1/F2/F3/F4 and F1/F2 on the time plane T1, and the open-fault candidate D-open relates to the fault terminals F5 and F6 on the time plane T2 shown in FIG. 18. The second related fault terminal information merging means 322 merges the pieces of related fault terminal information on the time plane T1 and the pieces of related fault terminal information on the time plane T2 shown in FIG. 18 at step C2 if the logic state of each node is identical with the logic state of the same node. The open-fault candidates A-open, B-open, C-open and D-open relate to the fault terminals F1/F2/F3/F4, F1/F2/F3/F4, F1/F2 and F5/F6, respectively.

Subsequently, the candidate selecting means 331 selects every two candidates from the open-fault candidates so as to obtain candidate pairs AB, AC, AD, BC, BD and CD at step D1. The unqualified candidate removing means 332 removes the candidate pairs which do not meet the conditions of the bridge-fault candidate at step D2. The candidate pairs AB, AC, BD and CD are eliminated from the list of bridge-fault candidates, because the candidates of each pair have the same expected logic state on each time plane. The candidate pairs AC, BC and AB are further eliminated from the list, because all the fault terminals related to one of the candidates of each pair are perfectly contained in the fault terminal group of the other candidate of the same pair. As a result, only the candidate pair AD is left in the list. In other words, the candidate pair AD is only one bridge-fault candidate AD-bf.

Subsequently, the third related fault terminal information merging means 333 merges the pieces of related fault terminal information, and the bridge-fault candidate AD-bf is related to the fault terminals F1, F2, F3, F4, F5 and F6.

The merge judging means 334 investigates to see whether or not the third related fault terminal information merging means 333 has completed the merging at step D4. Since the time planes shown in FIGS. 17 and 18 were concurrently obtained at time T2, it is not necessary to merge the pieces of related fault terminal information. The answer at step D4 is given negative.

Subsequently, the candidate sorting means 335 sorts the bridge-fault candidates with the number of related fault terminals as weight at step D5. Only the bridge-fault candidate AD-bf is left in the list of bridge-fault candidates, and is related to the fault terminals F1, F2, F3, F4, F5 and F6. The candidate outputting means 336 delivers the pieces of bridge-fault candidate information representative of the list of bridge-fault candidates and the related fault terminals to the output unit 6 and the bridge-fault candidate memory 53 at step D6.

The job at step A5 is hereinbelow described in detail on the basis of the fault candidates described with reference to FIGS. 16 to 18. First, the candidate memory searching means 341 reads out the pieces of fault candidate information from the stuck-at fault candidate memory 51, the pieces of open-fault candidate information from the open-fault candidate memory 52 and the pieces of bridge-fault candidate information from the bridge-fault candidate memory 53 at step E1, and draws up the list of mixed fault candidates. The list of mixed fault candidates contains B-sa0 relating to the fault terminals F1, F2, F3, F4, F5 and F6, A-sa0 relating to the fault terminals F1, F2, F3 and F4, C-sa1 relating to the fault terminals F1, F2 and F5, A-sa1 relating to the fault terminals F5 and F6, D-sa0 relating to the fault terminals F5 and F6, A-open relating to the fault terminals F1, F2, F3, F4, F5 and F6, B-open relating to the fault terminals F1, F2, F3, F4, F5 and F6, C-open relating to the fault terminals F1, F2 and F5, D-open relating to the fault terminals F5 and F6 and AD-bf relating to the fault terminals F1, F2, F3, F4, F5 and F6.

Subsequently, the double candidate eliminating means 342 checks the list to see whether or not any mixed fault candidate is doubled therein, and eliminates open-fault candidates same as stuck-at fault candidates and having the fault terminals identical with those of the stuck-at fault candidates from the list at step E2. The candidates B-sa0 and B-open stand in the list, and the fault terminals related to B-sa0 are identical with the fault terminals related to B-open. For this reason, the candidate B-open is eliminated from the list. Similarly, the double candidate eliminating means 342 eliminates the candidates C-open and D-open from the list. As a result, list of mixed fault candidates contains B-sa0 relating to the fault terminals F1, F2, F3, F4, F5 and F6, A-sa0 relating to the fault terminals F1, F2, F3 and F4, C-sa1 relating to the fault terminals F1, F2 and F5, A-sa1 relating to the fault terminals F5 and F6. D-sa0 relating to the fault terminals F5 and F6, A-open relating to the fault terminals F1, F2, F3, F4, F5 and F6 and AD-bf relating to the fault terminals F1, F2, F3, F4, F5 and F6.

Subsequently, the mixed fault candidate sorting means 343 sorts the mixest fault candidate with the number of relates fault terminals as the weight at step E3, and the mixed fault candidates are rearranged in the following order. The mixed candidate B-sa0 relating to the fault terminals F1, F2, F3, F3, F4, F5 and F6 stand the first position on the list, and the mixed candidates A-open relating to the fault position on the list, and the mixed candidates A-open relating to the fault terminals F1, F2, F3, F4, F5 and F6, A-sa0 relating to the fault terminals F1, F2, F3, and F4, C-sa1 relating to the fault terminals F1, F2 and F5, A-sa1 relating to the fault terminals F5, and F6, A-sa0 relating to the fault terminals F5, and F6 stand the second the last positions on the list of mixed fault candidates.

Finally, the mixed fault candidate outputting means 344 delivers the pieces of mixed fault candidate information representative of the mixed fault candidates and the relates fault terminals to the output unit 6 and the mixed fault candidate memory 54.

As will be understood from the foregoing description, the fault analyzing system according to the present invention presumes the open-fault candidates and the bridge-fault candidates as well as the stuck-at fault candidates. Moreover, the fault analyzing system according to the present invention completes the analysis without consuming a long time, because the fault analyzing system presumes the fault candidates through merging the nodes of fault propagation paths on different time planes.

Second Embodiment

Figure 19:
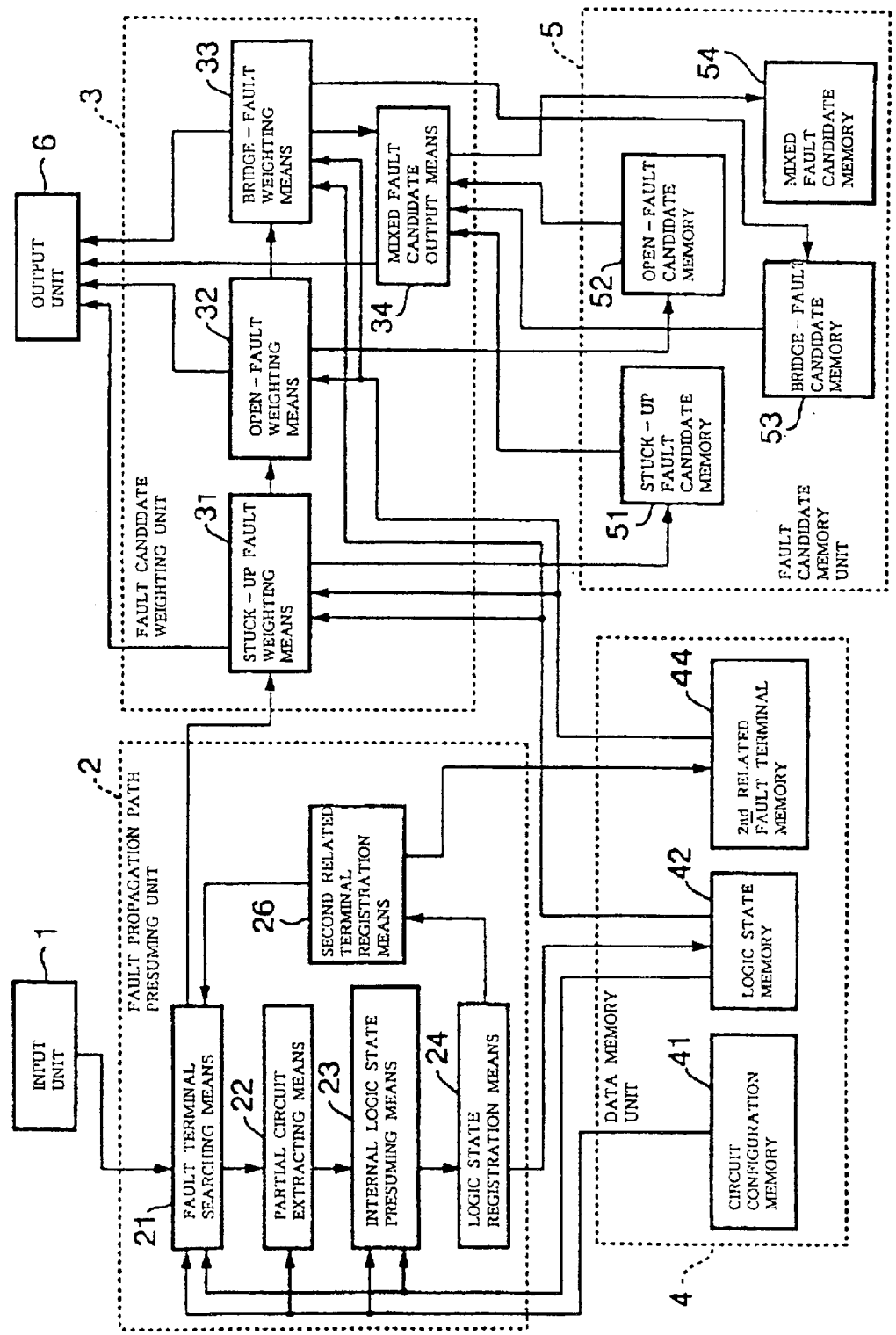
FIG. 19 is a block diagram showing the arrangement of another fault analyzing system according to the present invention.

Turning to FIG. 19 of the drawings, another fault analyzing system embodying the present invention largely comprises an input unit 1, a fault propagation path presuming unit 2A, a fault candidate weighting unit 3, a data memory unit 4A, a fault candidate memory unit 5 and an output unit 6. The input unit 1, the fault candidate weighting unit 3, the fault candidate memory unit 5 and the output unit 6 are similar to those of the first embodiment. The fault propagation path presuming unit 2A and the data memory unit 4A are similar to the fault propagation path presuming unit 2 and the data memory unit 4 except a second related terminal registration means 26 and a second related fault terminal memory 44. For this reason, the means incorporated therein are labeled with the same references, and description is focused on the second related terminal registration means 26 and the second related fault terminal memory 44.

The internal logic state presuming means 23 presumes fault propagation paths as similar to that of the first embodiment, and notifies the fault propagation paths to the second related terminal registration means 26. The second related terminal registration means 26 stores the output terminals of partial circuits related to the nodes on the fault propagation paths in the partial circuits and the fault terminals of the logic circuits related to the output terminals on the fault propagation paths in the second related fault terminal memory 44.

The second related fault terminal memory 44 hierarchically manages the related fault terminals. Namely, the relation between the nodes in each partial circuit and the output terminals of the partial circuit and the relation between the output terminals of the partial circuit and the fault terminals of the logic circuits in the partial circuit are separately managed in the second related the fault terminal memory 44. While the searching means searches the second related fault terminal memory 44 for fault terminals related to nodes on fault propagation paths, the searching means firstly searches the partial circuits for the output terminals of the partial circuits on the fault propagation paths, and, thereafter, selects the fault terminals from the output terminals of the partial circuits.

Figure 20:
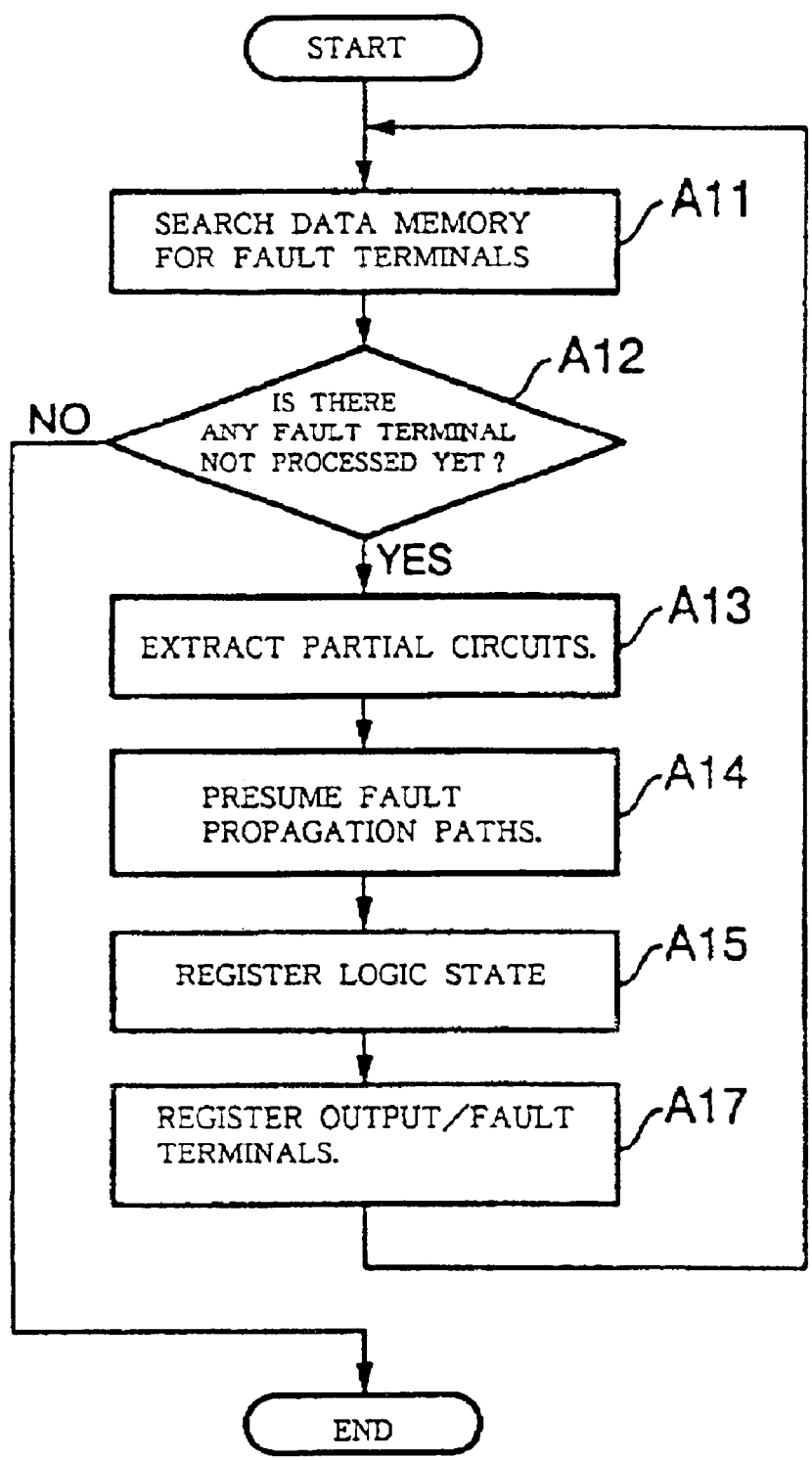
FIG. 20 is a flowchart showing a sequence of jobs executed by a fault propagation path presuming unit incorporated in the fault analyzing system.

Subsequently, description is made on the behavior of the fault analyzing system implementing the second embodiment with reference to FIG. 20. The fault terminal searching means 21, the partial circuit extracting means 22, the internal logic state presuming means 23 and the logic state registration means 24 behaves as similar to those of the first embodiment, and steps A11, A12, A13, A14, A15 are not described for the sake of simplicity.

The fault propagation path presuming unit 2A proceeds to step A17. The second related terminal registration means 26 searches the fault propagation paths in the partial circuits presumed by the internal logic state presuming means 23 for the output terminals related to nodes, i.e., gates signal lines on the fault propagation paths, and stores the pieces of related terminal information representative of the output terminals in the second related fault terminal memory 44. The second related terminal registration means 26 specifies fault terminals of logic gates related to the output terminals on the fault propagation paths, and stores the pieces of related fault terminal information representative of the fault terminal in the second related fault terminal memory 44.

The job at step A17 is hereinbelow described in detail with reference to FIG. 3. The sequential circuit shown in FIG. 3 includes the six flip flops FF1, FF2, FF3, FF4, FF5 and FF6, and four fault terminals F1, F2, F3 and F4 are found at time T+2.

The fault terminal searching means 21 searches the circuit layouts stored in the circuit configuration memory 41 and the logic state stored in the logic state memory 42 for the fault terminals, and specifies the fault terminals F1, F2, F3 and F4 at step A11. Since the fault terminals have been found, the answer at step A12 is given affirmative, and the fault propagation path presuming unit 2A proceeds to step A13.

The partial circuit extracting means 22 accesses the pieces of data information representative of the circuit layouts stored in the circuit configuration memory 41, and extracts the partial circuits c1, c2 and c3 related to the fault terminals F1, F2, F3 and F4 from the sequential circuit. The extracted partial circuits have boundaries defined by the flip flops.

The internal logic state presuming means 23 accesses the pieces of data information stored in the memories 41 and 42, and presumes fault propagation paths on the basis of the circuit layouts and the logic state at the boundaries between the partial circuits at step A14. The internal logic state presuming means 23 specifies the fault propagation path p12 in the partial circuit c1, the fault propagation paths p13, p14 and p15 in the partial circuit c2 and the fault propagation path p16 in the partial circuit c3. The logic state registration means 24 stores the pieces of data information representative of the logic state presumed at step A14 in the logic state memory 42 at step A15, and further stores the pieces of data information representative of FF4, FF5 and FF6 as the fault terminals at time T+1.

The fault propagation path presuming unit 2A proceeds to step A17. The second related terminal registration means 26 stores the fault terminals on the fault propagation paths in the second related fault terminal memory 44 as follows. F1 is stored as the fault terminal related to the node on the fault propagation path p12 in the partial circuit c1. F2 and F3 are stored as the fault terminals related to the nodes on the fault propagation path p13 in the partial circuit c2. F2 is stored as the fault terminal related to the node on the fault propagation path p14 in the partial circuit c2. F3 is stored as the fault terminal related to the node on the fault propagation path p15 in the partial circuit c2. F4 is stored as the fault terminal related to the node on the fault propagation path p16 in the partial circuit c3.

The fault propagation path presuming unit 2A returns to step A11, and specifies FF4, FF5 and FF6. The fault propagation path presuming unit 2A reiterates the loop consisting of steps A11 to 17 so as to extract the partial circuits c1 to c7 and presume the fault propagation paths p1 to p16.

Finally, the pieces of related terminal information are stored in the second related fault terminal memory 44 at step A17 as follows. In the partial circuit c1, F1 is on the fault propagation path p12. In the partial circuit c2, F2 and F3 are on the fault propagation path p13, F2 is on the fault propagation path p14, and F3 is on the fault propagation path p15. In the partial circuit c3, F4 is on the fault propagation path p16. In the partial circuit c4, FF4 is on the fault propagation path p6, FF4 is on the fault propagation path p7, FF4 is on the fault propagation path p8 and FF4 relates to F1. In the partial circuit c5, FF5 and FF6 are on the fault propagation path p9, FF5 is on the fault propagation path p10, FF6 is on the fault propagation path p11, FF5 relates to F2 and F3, and FF6 relates to F4. In the partial circuit c6, FF1 and FF2 are on the fault propagation path p1, FF1 and FF2 are on the fault propagation path p2, FF1 is on the fault propagation path p3, FF2 is on the fault propagation path p4, FF1 relates to F1, and FF2 relates to F1. In the partial circuit c7, FF3 is on the fault propagation path p1, FF3 is on the fault propagation path p5, and FF3 relates to F2, F3 and F4.

Figure 21:
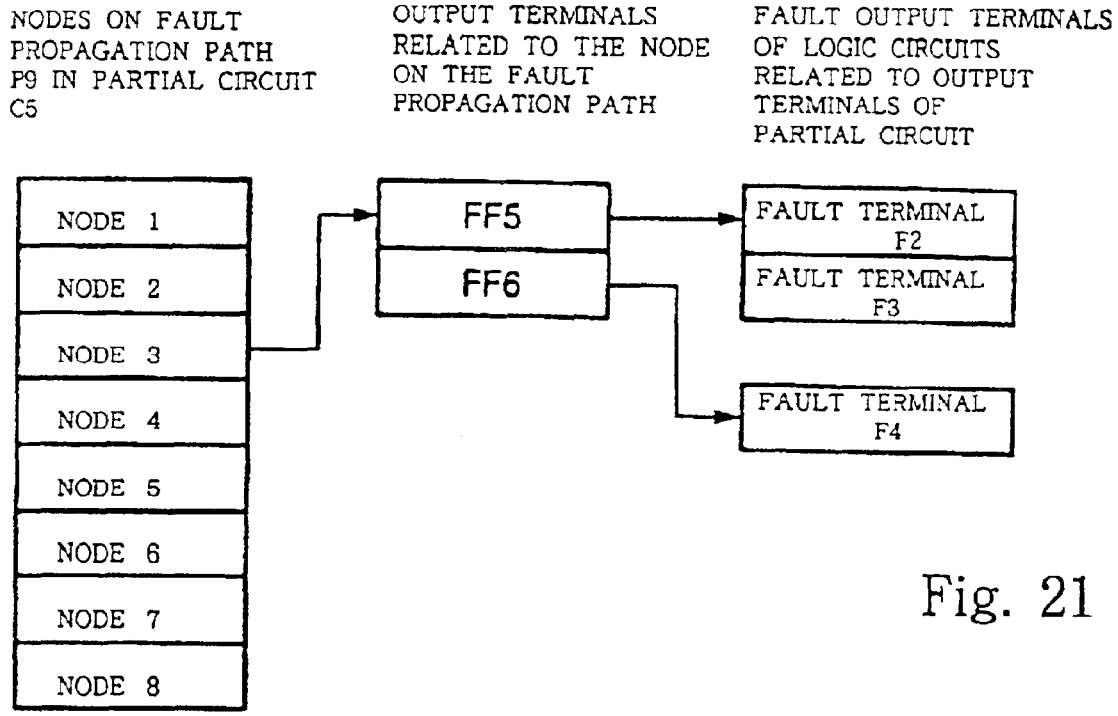
FIG. 21 is a view showing a hierarchy of pieces of related terminal information stored in a related fault terminal memory in the fault analyzing system.
Figure 22:
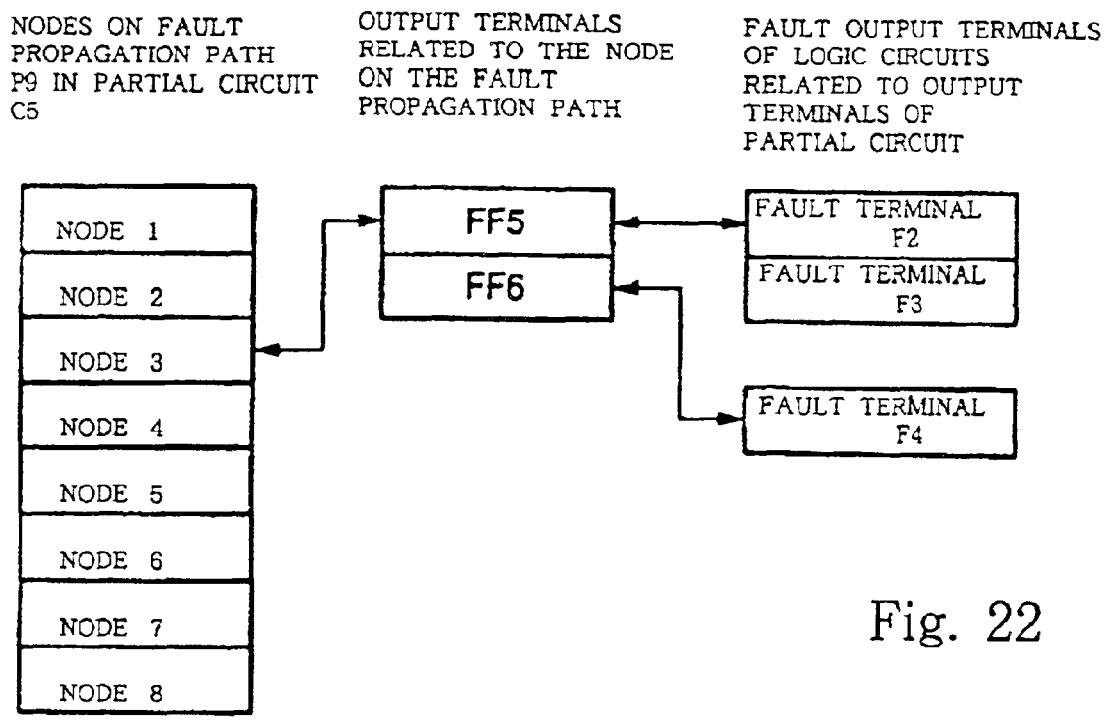
FIG. 22 is a view showing another hierarchy of pieces of related terminal information stored in a related fault terminal memory in the fault analyzing system.

Thus, the pieces of related terminal information are hierarcally stored in the second related fault terminal memory 44 so that the amount of data information is reduced. For example, the pieces of related fault terminal information representative of the nodes related to the nodes on the fault propagation path p9 in the partial circuit c6 are managed in the second related fault terminal memory 44 as shown in FIG. 21. When the mutual relation is stored as indicated by arrows shown in FIG. 22, it is possible to search the pieces of related terminal information bidirectionally.

The nodes specified as described hereinbefore are possibly on the fault propagation paths, and are candidates of fault. The time planes are overlapped as shown in FIG. 15. When the pieces of related fault terminal information are merged in different manners, lists of fault candidates are obtained for different kinds of fault.

Third Embodiment

Figure 23:
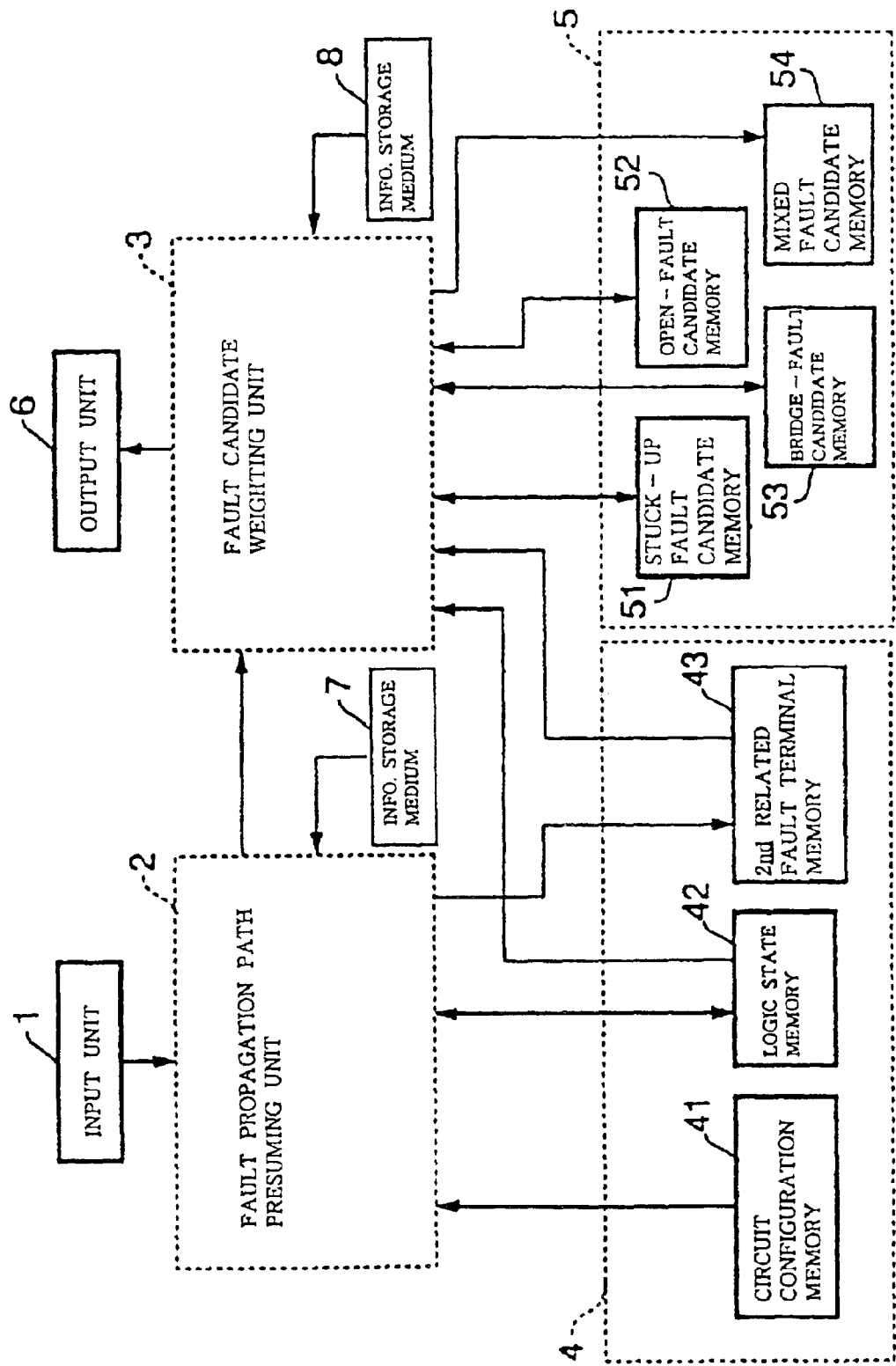
FIG. 23 is a block diagram showing the arrangement of yet another fault analyzing system according to the present invention.

Turning to FIG. 23 of the drawings, yet another fault analyzing system embodying the present invention includes an information storage medium 7 for storing a fault propagation path presuming program and another information storage medium 8 for storing a fault candidate weighting program in addition to the components of the fault analyzing system implementing the second embodiment or the first embodiment. The information storage media 7 and 8 may be implemented by a magnetic disk or semiconductor memory devices.

The fault propagation path presuming program is read out from the information storage medium 7 into the fault propagation path presuming unit 2A/2, and is used for controlling the fault propagation path presuming operation. Similarly, the fault candidate weighting program is read out from the information storage medium 8 into the fault candidate weighting unit 3, and is used for controlling the fault candidate weighting operation.

The fault propagation path presuming program runs on the fault propagation path presuming unit 2A/2 so as to render the fault propagation path presuming unit 2A/2 achieving the jobs described in connection with the first and second embodiments. When the input unit 1 supplies the logic state at the input terminals and the logic state at the output terminals of objective gates, the fault propagation path presuming unit 2/2A accesses the pieces of data information stored in the data memory unit 4, and presumes fault propagation paths. The fault propagation path presuming unit 2/2A stores the pieces of data information representative of the presumed logic state and the fault propagation paths in the logic state memory 42 and the pieces of related fault terminal information representative of the output and/or fault terminals in the related fault terminal memory 43/44.

Subsequently, the fault candidate weighting unit 3 renders the stuck-at fault weighting means 31, the open-fault weighting means 32 and the bridge-fault weighting means 33 drawing up a list of stuck-at fault candidates, a list of open-fault candidates and a list of bridge-fault candidates on the basis of the pieces of related fault terminal information on plural time planes as well as outputting the pieces of stuck-at fault candidate information, the pieces of open-fault candidate information and the pieces of bridge-fault candidate information to the output unit 6 and the respective fault candidate memories 51, 52 and 53. The fault candidate weighting unit 3 further renders the mixed fault candidate output means 34 drawing up a list of mixed fault candidates on the basis of the pieces of fault candidate information read out from the fault candidate memories 51, 52 and 53, and, thereafter, the mixed fault candidate output means 34 delivers the pieces of mixed fault candidate information to the output unit 6 and the mixed fault candidate memory 54. Thus, the fault propagation path presuming program and the fault candidate weighting program run on the data processor of the fault propagation path presuming unit 2/2A and the data processor of the fault candidate weighting unit 3 respectively, and achieves the jobs described in connection with the first and second embodiments.

As will be appreciated from the foregoing description, the fault analyzing system according to the present invention searches the pieces of related fault terminal information for nodes identical in logic state between different time planes, and merges the pieces of related fault terminal information representative of the nodes identical in logic state between the different time planes for drawings up a list of weighted stuck-up fault candidates. The fault analyzing system according to the present invention further searches the pieces of related fault terminal information for nodes relating to the fault terminals on the time planes, and merges the pieces of related fault terminal information on the different time planes for drawing up a list of weighted open-fault candidates. The fault analyzing system according to the present invention forms every two open-fault candidates into candidate pairs on each time plane, and merges the pieces of related fault terminal information for the candidates of the pairs for drawing up a list of weighted bridge-fault candidates. Thus, the fault analyzing system according to the present invention merges the pieces of related fault terminal information on the plural time planes under the different conditions so as to draw up the lists for the plural kinds of fault.

The fault analyzing system according to the present invention sorts a list of mixed fault candidates with the number of related fault terminals as the weight so as to draw up a list of weighted mixed fault candidates which contains the stuck-up fault candidates, the open-fault candidates and the bridge fault candidates without overlapping.

The fault analyzing system according to the present invention carries out the presumption of the fault propagation paths once. The fault analyzing system according to the present invention merges the pieces of related fault terminal information on plural time planes through different manners for drawing up the lists for different kinds of fault. Although the presumption is time-consuming, the fault analyzing system according to the present invention carries out the presumption only once. For this reason, even though a test result contains noise, the fault analyzing system according to the present invention completes the analysis within a relatively short time period.

Although particular embodiments of the present invention have been shown and described, it will be apparent to those skilled in the art that various changes and modifications may be made without departing from the spirit and scope of the present invention.

For example, the fault propagation path presuming unit 2 and the fault candidate weighting unit 3 may be implemented by a single data processing system. A single memory unit may be shared between the data memory unit 4 and the fault candidate memory unit 5.

What is claimed is:

1. A fault analyzing system for finding candidates of plural kinds of fault, comprising:

a fault propagation path presuming unit presuming logic state along signal paths for determining fault propagation paths connected to output terminals where error signals are observed, and specifying fault terminals related to nodes on said fault propagation paths for producing pieces of related fault terminal information on plural time planes; and a fault candidate weighting unit merging the pieces of related fault terminal information on one of said plural time planes with the pieces of related fault terminal information on another of said plural time planes in accordance with a logic state of said nodes on said fault propagation paths so as to determine plural groups of fault candidates for said plural kinds of fault.

2. The fault analyzing system as set forth in claim 1, further includes a data memory unit connected to said fault propagation path presuming unit and said fault candidate weighting unit, and storing first pieces of data information representative of a layout of an electric circuit to be analyzed, second pieces of data information representative of said logic state presumed by said fault propagation path presuming unit and logic state expected along said signal path and said pieces of related terminal information.

3. The fault analyzing system as set forth in claim 2, in which said fault propagation path presuming unit includes a fault terminal searching means accessing said first pieces of data information and said second pieces of data information so as to search said data memory for said fault terminals, a partial circuit extracting means accessing said first pieces of data information so as to extract partial circuits related to said fault terminals from said electric circuit, an internal logic state presuming means accessing said first pieces of data information and said second pieces of data information so as to presume said fault propagation paths, a logic state registration means for storing the second pieces of data information representative of said logic state along said fault propagation paths in said data memory, and a related terminal registration means accessing said first pieces of data information and said second pieces of data information representative of said logic state along said fault propagation paths so as to specify said fault terminals related to said nodes on said fault propagation paths.

4. The fault analyzing system as set forth in claim 3, in which said related terminal registration means determines a relation between said nodes of said partial circuits and output terminals of said partial circuits and a relation between said output terminals of said partial circuits and said fault terminals related to logic circuits in said electric circuit so that said pieces of related terminal information are managed in a hierarchy in said data memory.

5. The fault analyzing system as set forth in claim 1, in which said fault candidate weighting unit includes plural weighting means merging said pieces of related fault terminal information on said one of said plural time planes with said pieces of related fault terminal information on said another of said plural time planes in accordance with said logic state of said nodes on said fault propagation paths, respectively, so as to determine said plural groups of fault candidates for said plural kinds of fault, respectively.

6. The fault analyzing system as set forth in claim 5, in which one of said plural weighting means determines one of the group of stuck-at fault candidates, the group of open-fault candidates and the group of bridge-fault candidates.

7. The fault analyzing system as set forth in claim 6, in which another of said plural weighting means determines another of said group of stuck-at fault candidates, said group of open-fault candidates and said group of bridge-fault candidates.

8. The fault analyzing system as set forth in claim 7, in which yet another of said plural weighting means determines yet another of said group of stuck-at fault candidates, said group of open-fault candidates and said group of bridge-fault candidates.

9. The fault analyzing system as set forth in claim 2, in which said fault candidate weighting unit includes a weighting means having
 a related fault terminal information searching means accessing said pieces of related terminal information so as to obtain said plural time planes, and
 a related fault terminal information merging means merging said pieces of related fault terminal information on said one of said plural time planes with said pieces of related fault terminal information on said another of said plural time planes in so far as said pieces of related fault terminal information on said one of said plural time planes are identical in logic state and location on said plural time planes with said pieces of related fault terminal information on aid another of said plural time planes, thereby determining a group of stuck-at fault candidates.

10. The fault analyzing system as set forth in claim 9, in which said one of said plural weighting means further includes a candidate sorting means for sorting said stuck-at fault candidates with the number of said fault terminals serving as a weight for making a list of said stuck-at fault candidates arranged in order of importance.

11. The fault analyzing system as set forth in claim 9, in which said fault candidate weighting unit further includes another weighting means means having
 a related fault terminal information searching means accessing said pieces of related terminal information so as to obtain said plural time planes, and
 a related fault terminal information merging means merging said pieces of related fault terminal information on one of said plural time planes with said pieces of related fault terminal information on another of said plural time planes in so far as said pieces of related fault terminal information on said one of said plural time planes are identical in location on said plural time planes with said pieces of related fault terminal information on said another of said plural time planes, thereby determining a group of open-fault candidates.

12. The fault analyzing system as set forth in claim 11, in which said another weighting means further includes a candidate sorting means for sorting said open-fault candidates with the number of said fault terminals serving as a weight for making a list of said open-fault candidates arranged in order of importance.

13. The fault analyzing system as set forth in claim 11, in which said fault candidate weighting unit further includes yet another weighting means having
 a candidate selecting means selectively pairing said open-fault candidates for forming plural candidate pairs,
 an unqualified candidate eliminating means checking the second pieces of data information representative of the expected logic state and said pieces of related fault terminal information to see whether or not each candidate pair meets the conditions of a bridge-fault, and eliminating said each candidate pair if said each candidate pair does not meet said conditions so as to determine qualified candidate pairs,
 another related fault terminal information merging means merging said pieces of related fault terminal information related to said qualified candidate pairs on one of said plural time planes with said pieces of related fault terminal information related to said qualified candidate pairs on another of said plural time planes for determining a group of bridge-fault candidates.

14. The fault analyzing system as set forth in claim 13, in which said yet another weighting means further includes a candidate sorting means for sorting said bridge-fault candidates with the number of said fault terminals serving as a weight for making a list of said bridge-fault candidates arranged in order of importance.

15. The fault analyzing system as set forth in claim 13, in which one of said conditions is that the open-fault candidates of each pair have the same expected logic state on each time plane, and another of said conditions is that the fault terminals related to one of said open-fault candidates of each pair are contained in a group of the fault terminals related to the other of said open-fault candidates of said pair on each time plane.

16. The fault analyzing system as set forth in claim 2, in which said fault candidate weighting unit includes a weighting means having
 a related fault terminal information searching means accessing said pieces of related terminal information so as to obtain said plural time planes, and
 a related fault terminal information merging means merging said pieces of related fault terminal information on said one of said plural time planes with said pieces of related fault terminal information on said another of said plural time planes in so far as said pieces of related fault terminal information on said one of said plural time planes are identical in location on said plural time planes with said pieces of related fault terminal information on said another of said plural time planes, thereby determining a group of open-fault candidates.

17. The fault analyzing system as set forth in claim 16, in which said one of said plural weighting means further includes a candidate sorting means for sorting said open-fault candidates with the number of said fault terminals serving as a weight for making a list of said open-fault candidates arranged in order of importance.

18. A method for finding candidates of plural kinds of fault, comprising the steps of:
 a) determining output terminals where error signals are observed;
 b) specifying fault terminals related to nodes of an electric circuit found on fault propagation paths connected to said output terminals for producing pieces of related fault terminal information on plural time planes; and c) merging the pieces of related fault terminal information representative of the fault terminals related to the nodes on one of said plural time planes with the pieces of related fault terminal information representative of the fault terminals related to said nodes on another of said plural time planes in accordance with a logic state of said nodes on said fault propagation paths so as to determine plural groups of fault candidates for said plural kinds of fault.

19. The method as set forth in claim 18, in which said step b) includes the sub-steps of
   b-1) accessing first pieces of data information representative of a layout of said electric circuit and second pieces of data information representative of logic state in said electric circuit and expected logic state stored in a data memory so as to determine said fault terminals,
   b-2) accessing said first pieces of data information stored in said data memory so as to extract partial circuits related to said fault terminals from said electric circuit, and
   b-3) accessing said first pieces of data information and said second pieces of data information stored in said data memory so as to presume said fault propagation paths,
   b-4) storing the second pieces of data information representative of said logic state along said fault propagation paths in said data memory, and
   b-5) accessing said first pieces of data information and said second pieces of data information representative of said logic state along said fault propagation paths so as to specify said fault terminals related to said nodes on said fault propagation paths.

20. The method as set forth in claim 18, in which said step c) includes the sub-steps of
   c-1) determining plural groups of pieces of related fault terminal information associated with said plural time planes, respectively,
   c-2) merging said pieces of related fault terminal information of one of said plural groups with said pieces of related fault terminal information of another of said plural groups in a first manner based on a logic state of said nodes of an electric circuit found on fault propagation paths so as to make a first list of candidates for a first kind of fault, and
   c-3) merging said pieces of related fault terminal information of one of said plural groups with said pieces of related fault terminal information of another of said plural groups in a second manner based on a logic state of said nodes of an electric circuit found on fault propagation oaths so as to make a second list of candidates for a second kind of fault.

21. The method as set forth in claim 20, in which said step c) further includes the sub-step of
   c-4) merging said pieces of related fault terminal information of one of said plural groups with said pieces of related fault terminal information of one of said plural groups with said pieces of related fault terminal information of another of said plural groups in a third manner based on a logic state of said nodes of an electric circuit found on fault propagation paths so as to make a third list of candidates for a third kind of fault.

22. The method as set forth in claim 21, in which said candidates on said second list are selectively paired with one another f or forming plural candidate pairs on each time plane, and the pieces of related fault terminal information related to one of the candidates of each pair are merged with the pieces of related fault terminal information related to the other candidate of said each pair if each of said candidates of said each pair meet conditions of said third kind of fault.

23. The method as set forth in claim 22, in which one of said conditions is that said candidates of each pair have the same expected logic state on each time plane, and another of said conditions is that the fault terminals related to one of said candidates of each pair are contained in a group of the fault terminals related to the other of said candidates of said pair on each time plane.

24. The method as set forth in claim 20, in which said pieces of related fault terminal information of said one of said plural groups are merged with said pieces of related fault terminal information of said another of said plural groups if each of said pieces of related fault terminal information is identical in logic state and location on the time planes with associated one of said pieces of related fault terminal information of said another of said plural groups for making said first list of candidates for a stuck-at fault in said step c-2).

25. The method as set forth in claim 20, in which said pieces of related fault terminal information of said one of said plural groups are merged with said pieces of related fault terminal information of said another of said plural groups if each of said pieces of related fault terminal information is identical in location on the time planes with associated one of said pieces of related fault terminal information of said another of said plural groups for making said second list of candidates for an open-fault in said step c-3).

26. An information storage medium for storing a computer program representative of a method for finding candidates of plural kinds of fault, comprising the steps of:
   a) determining output terminals where error signals are observed;
   b) specifying fault terminals related to nodes of an electric circuit found on fault propagation paths connected to said output terminals for producing pieces of related fault terminal information on plural time planes; and
   c) merging the pieces of related fault terminal information representative of the fault terminals related to the nodes on one of said plural time planes with the pieces of related fault terminal information representative of the fault terminal related to said nodes on another of said plural time planes in accordance with differences in signals on said fault terminals so as to determine plural groups of fault candidates for said plural kinds of fault.

27. The information storage medium as set forth in claim 26, in which said step b) includes the sub-steps of
   b-1) accessing first pieces of data information representative of a layout of said electric circuit and second pieces of data information representative of logic state in said electric circuit and expected logic state stored in a data memory so as to determine said fault terminals,
   b-2) accessing said first pieces of data information stored in said data memory so as to extract partial circuits related to said fault terminals from said electric circuit, and
   b-3) accessing said first pieces of data information and said second pieces of data information stored in said data memory so as to presume said fault propagation paths,
   b-4) storing the second pieces of data information representative of said logic state along said fault propagation paths in said data memory, and
   b-5) accessing said first pieces of data information and said second pieces of data information representative of said logic state along said fault propagation paths so as to specify said fault terminals related to said nodes on said fault propagation paths.

28. The information storage medium as set forth in claim 26, in which said step c) includes the sub-steps of
c-1) determining plural groups of pieces of related fault terminal information associated with said plural time planes, respectively,
c-2) merging said pieces of related fault terminal information of one of said plural groups with said pieces of related fault terminal information of another of said plural groups in a first manner based on a logic state of said nodes of an electric circuit found on fault propagation paths so as to make a first list of candidates for a first kind of fault, and
c-3) merging said pieces of related fault terminal information of one of said plural groups with said pieces of related fault terminal information of another of said plural groups in a second manner based on a logic state of said nodes of an electric circuit found on fault propagation paths so as to make a second list of candidates for a second kind of fault.

29. The method as set forth in claim 28, in which said step c) further includes the sub-step of c-4) merging said pieces of related fault terminal information of one of said plural groups with said pieces of related fault terminal information of another of said plural groups in a third manner based on a logic state of said nod s of an electric circuit found on fault propagation paths so as to make a first list of candidates for a third kind of fault.

30. The method as set forth in claim 29, in which said candidates on said second list are selectively paired with one another for forming plural candidate pairs on each time plane, and the pieces of related fault terminal information related to one of the candidates of each pair are merged with the pieces of related fault terminal information related to the other candidate of said each pair if each of said candidates of said each pair meet conditions of said third kind of fault.

31. The method as set forth in claim 30, in which one of said conditions is that said candidates of each pair have the same expected logic state on each time plane, and another of said conditions is that the fault terminals related to one of said candidates of each pair are contained in a group of the fault terminals related to the other of said candidates of said pair on each time plane.

32. The method as set forth in claim 28, in which said pieces of related fault terminal information of said one of said plural groups are merged with said pieces of related fault terminal information of said another of said plural groups if each of said pieces of related fault terminal information is identical in logic state and location on the time planes with associated one of said pieces of related fault terminal information of said another of said plural groups for making said first list of candidates for a stuck-at fault in said step c-2).

33. The method as set forth in claim 28, in which said pieces of related fault terminal information of said one of said plural groups are merged with said pieces of related fault terminal information of said another of said plural groups if each of said pieces of related fault terminal information is identical in location on the time planes with associated one of said pieces of related fault terminal information of said another of said plural groups for making said second list of candidates for an open-fault in said step c-3).

* * * * *